United States Patent
Matsuzaki

(10) Patent No.: US 11,541,672 B2
(45) Date of Patent: Jan. 3, 2023

(54) INK SET AND RECORDING METHOD USING INK SET

(71) Applicant: Seiko Epson Corporation, Tokyo (JP)

(72) Inventor: Akiko Matsuzaki, Matsumoto (JP)

(73) Assignee: SEIKO EPSON CORPORATION

( * ) Notice: Subject to any disclaimer, the term of this patent is extended or adjusted under 35 U.S.C. 154(b) by 932 days.

(21) Appl. No.: 16/351,631

(22) Filed: Mar. 13, 2019

(65) Prior Publication Data

US 2019/0283464 A1    Sep. 19, 2019

(30) Foreign Application Priority Data

Mar. 14, 2018 (JP) .............................. JP2018-046638

(51) Int. Cl.

| | |
|---|---|
| C09D 11/00 | (2014.01) |
| B41J 11/00 | (2006.01) |
| B41M 5/00 | (2006.01) |
| C09D 11/40 | (2014.01) |
| C09D 11/54 | (2014.01) |
| C09D 11/38 | (2014.01) |
| B41J 2/21 | (2006.01) |
| C09D 11/322 | (2014.01) |
| C09D 1/00 | (2006.01) |
| C09D 4/00 | (2006.01) |
| C09D 5/00 | (2006.01) |

(Continued)

(52) U.S. Cl.
CPC .......... *B41J 11/0015* (2013.01); *B41J 2/2114* (2013.01); *B41J 2/2117* (2013.01); *B41M 5/0023* (2013.01); *C09D 11/322* (2013.01); *C09D 11/38* (2013.01); *C09D 11/40* (2013.01); *C09D 11/54* (2013.01)

(58) Field of Classification Search
USPC ............ 106/31.1, 31.13, 31.6, 31.01; 347/21
See application file for complete search history.

(56) References Cited

U.S. PATENT DOCUMENTS

| | | | |
|---|---|---|---|
| 2015/0054883 A1 | 2/2015 | Okuda et al. | |
| 2016/0194824 A1 | 7/2016 | Ohashi et al. | |
| 2017/0247561 A1* | 8/2017 | Nakagawa | ........... B41J 11/0015 |

(Continued)

FOREIGN PATENT DOCUMENTS

| | | |
|---|---|---|
| EP | 2 894 203 A1 | 7/2015 |
| JP | 2015-71738 A | 4/2015 |
| JP | 2017-186455 A | 10/2017 |

OTHER PUBLICATIONS

Extended European Search Report for Application No. EP 19 16 2901 dated Jul. 16, 2019 (7 pages).

*Primary Examiner* — James E McDonough
(74) *Attorney, Agent, or Firm* — Harness, Dickey & Pierce, P.L.C.

(57) ABSTRACT

An ink set contains a white ink composition containing a white coloring material and a resin, and a non-white ink composition containing a non-white coloring material and a resin. The white ink composition and the non-white ink composition are used with a treatment liquid containing a coagulant for coagulating a component of the non-white ink composition. When a 5% by mass calcium acetate monohydrate aqueous solution and each of the ink compositions are mixed, a ratio of the viscosity increase after the mixing to the viscosity increase before the mixing is lower in the white ink composition than in the non-white ink composition.

9 Claims, 6 Drawing Sheets

(51) Int. Cl.
*C09K 3/00* (2006.01)
*B41J 2/015* (2006.01)

(56) References Cited

U.S. PATENT DOCUMENTS

2017/0292035 A1 10/2017 Saito et al.
2018/0244943 A1 8/2018 Okuda et al.

* cited by examiner

FIG. 1A  FIG. 1B  FIG. 1C
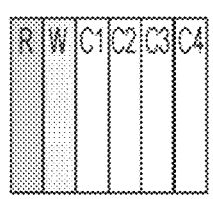
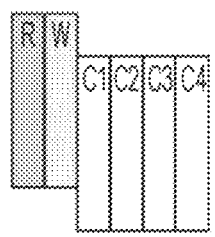
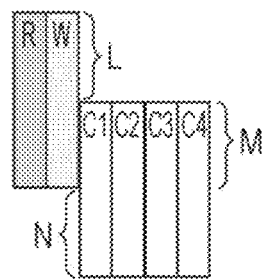
FIG. 1D  FIG. 1E  FIG. 1F
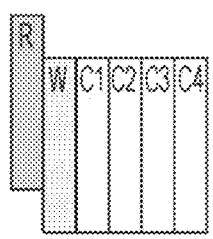
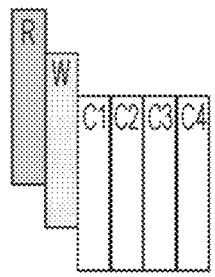
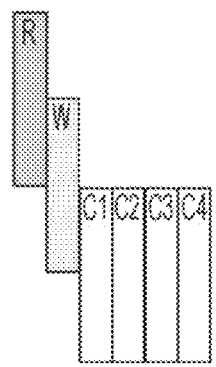
MAIN SCANNING DIRECTION ↔   SUBSCANNING DIRECTION ↓

INK SET AND RECORDING METHOD USING INK SET

BACKGROUND

1. Technical Field

The present invention relates to an ink set and to a recording method using the ink set.

2. Related Art

An ink jet recording method enables recording of a high-definition image by using a relatively simple apparatus and has rapidly developed in various fields. During development, various examinations for image quality, discharge stability, and the like have been performed. For example, to provide an ink set capable of suppressing bleeding between a plurality of inks when the inks are recorded while overlapping each other on a non-absorptive recording medium or a low-absorptive recording medium and causing hardly any clogging, JP-A-2015-71738 discloses an ink set which contains a treatment liquid containing a coagulant, a first ink containing a coloring material, and a second ink containing a coloring material, which is used for recording to a non-absorptive recording medium or a low-absorptive recording medium, and which is used in such a manner that the treatment liquid, the first ink, and the second ink are discharged onto the recording medium so as to overlap in this order. A method is known in which, when recording is performed on recording media other than a white recording medium, such as a transparent recording medium or a colored recording medium, as in JP-A-2015-71738, white ink is caused to adhere to a recording medium to provide a background for a color ink to thereby improve color developability and the like by using the white ink to produce a concealing effect.

However, a color ink which is deposited while overlapping a white ink is used for creating fine lines or a picture in some cases, and thus it is necessary to allow the color ink to sufficiently react with a treatment liquid to thereby suppress the occurrence of bleeding from the viewpoint of obtaining sufficient image quality. When the white ink and the color ink are recorded while overlapping, the white ink and the color ink are color-mixed, and this poses a problem of yielding poor sharpness.

SUMMARY

An advantage of some aspects of the invention is to provide an ink set capable of giving recorded content excellent in sharpness and a recording method using the ink set.

The present inventors have extensively examined to solve the problem. As a result, the present inventors have found that the above-described problem can be solved by the use of a white ink composition having a relatively low coagulation property and a non-white ink composition having a relatively high coagulation property in combination, and thus have accomplished the invention.

More specifically, the details of some aspects of the invention are as follows.

An ink set according to a first aspect contains a white ink composition containing a white coloring material and a resin and a non-white ink composition containing a non-white coloring material and a resin. The white ink composition and the non-white ink composition are used with a treatment liquid containing a coagulant for coagulating the component of the non-white ink composition, and, when a 5% by mass calcium acetate monohydrate aqueous solution and each of the ink compositions are mixed, a ratio of a viscosity increase after the mixing to a viscosity increase before the mixing is lower in the white ink composition than in the non-white ink composition.

An ink set according to a second aspect includes the ink set according to the first aspect, in which, when 50% by mass of each of the ink compositions is evaporated, a ratio of a viscosity increase after the evaporation to a viscosity increase before the evaporation is higher in the white ink composition than in the non-white ink composition.

An ink set according to a third aspect includes the ink set according to the first or second aspect, in which the content of a pigment of the white ink composition is larger than the content of a pigment of the non-white ink composition.

An ink set according to a fourth aspect includes the ink set according to any one of the first to third aspects, in which the coagulant is any one of a polyvalent metal salt, an organic acid or a salt thereof, and a cationic compound.

An ink set according to a fifth aspect includes the ink set according to any one of the first to fourth aspects, in which the white coloring material is at least any one of a metal oxide and a hollow resin particle.

An ink set according to a sixth aspect includes the ink set according to any one of the first to fifth aspects, in which the ratio of the viscosity increase after the mixing to the viscosity increase before the mixing is 3.00 or less in the white ink composition.

An ink set according to a seventh aspect includes the ink set according to any one of the first to sixth aspects, in which, when 50% by mass of each of the ink compositions is evaporated, a ratio of a viscosity increase after the evaporation to a viscosity increase before the evaporation is 20.00 or more in the white ink composition.

A recording method according to an eighth aspect uses the ink set according to any one of the first to seventh aspects and includes causing the treatment liquid to adhere to a recording medium, causing the non-white ink composition to adhere to the recording medium, and causing the white ink composition to adhere to the recording medium.

A recording method according to a ninth aspect includes the recording method according to the eighth aspect, in which each of the adhesion of the non-white ink composition and the adhesion of the white ink composition is performed by discharging the ink compositions from an ink jet head.

A recording method according to a tenth aspect includes the recording method according to the eighth or ninth aspect and is configured so that the ink jet head has a non-white ink composition nozzle group used for recording on the downstream side in the subscanning direction relative to a white ink composition nozzle group used for recording and has a treatment liquid nozzle group used for recording on the upstream side in the subscanning direction relative to or in a portion overlapping the white ink composition nozzle group used for recording.

A recording method according to an eleventh aspect includes the recording method according to the eighth or ninth aspect and is configured so that the ink jet head has a treatment liquid nozzle group used for recording on the downstream side in the subscanning direction relative to a white ink composition nozzle group used for recording and has a non-white ink composition nozzle group used for recording on the downstream side in the subscanning direction relative to the treatment liquid nozzle group used for the recording.

A recording method according to a twelfth aspect includes the recording method according to any one of the eighth to eleventh aspects and is configured so that the adhesion of the treatment liquid, the adhesion of the non-white ink composition, and the adhesion of the white ink composition are performed by main scanning of discharging the treatment liquid, the non-white ink composition, and the white ink composition from ink jet heads while changing the position of the ink jet heads relative to a recording medium in the main scanning direction to cause the treatment liquid, the non-white ink composition, and the white ink composition to adhere to the recording medium and subscanning of changing the position of the ink jet heads relative to the recording medium in the subscanning direction crossing the main scanning direction.

A recording method according to a thirteenth aspect includes the recording method according to the twelfth aspect and is configured so that the ink jet head has the non-white ink composition nozzle group used for recording on one side in the main scanning direction relative to the white ink composition nozzle group used for recording and has the treatment liquid nozzle group used for recording on the other side in the main scanning direction relative to the white ink composition nozzle group used for recording.

A recording method according to a fourteenth aspect includes the recording method according to any one of the eighth to thirteenth aspects, in which the recording medium is a low-absorptive recording medium or a non-absorptive recording medium.

A recording method according to a fifteenth aspect includes the recording method according to any one of the eighth to fourteenth aspects and further includes heating the recording medium, in which the ink compositions are caused to adhere to the heated recording medium.

A recording method according to a sixteenth aspect uses a white ink composition containing a white coloring material and a resin, a non-white ink composition containing a non-white coloring material and a resin, and a treatment liquid containing a coagulant for coagulating the component of the non-white ink composition, and includes causing the treatment liquid to adhere to a recording medium, causing the non-white ink composition to adhere to the recording medium, and causing the white ink composition to adhere to the recording medium, in which, when the treatment liquid and each of the ink compositions are mixed, a ratio of the viscosity increase after the mixing to the viscosity increase before the mixing is lower in the white ink composition than in the non-white ink composition.

A recording apparatus according to a seventeenth aspect performs recording by the recording method according to any one of the eighth to sixteenth aspects.

BRIEF DESCRIPTION OF THE DRAWINGS

Embodiments of the invention will be described with reference to the accompanying drawings, wherein like numbers reference like elements.

FIGS. 1A to 1F are schematic views illustrating the arrangement of nozzle groups of ink jet heads used in this embodiment.

DESCRIPTION OF EXEMPLARY EMBODIMENTS

Figure 2:
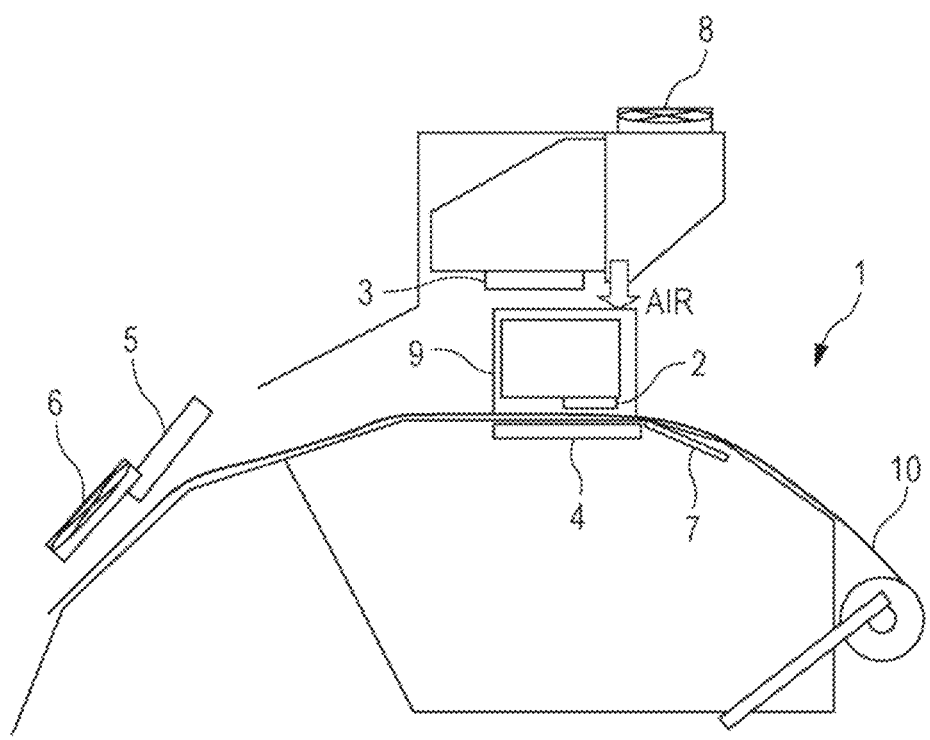
FIG. 2 is a schematic cross sectional view illustrating the configuration of a recording apparatus used in this embodiment.

Hereinafter, an embodiment of the invention (hereinafter referred to as "this embodiment") is described in detail with reference to the drawings but the invention is not limited thereto and can be variously modified without deviating from the scope of the invention as described in the claims. In the drawings, the same components are designated by the same reference numerals and the same description is omitted. The positional relationship, such as left, right, top, and bottom, shall be based on the positional relationship illustrated in the drawings unless otherwise particularly specified. Furthermore, the dimensional ratios in the drawings are not limited to the ratios illustrated in the drawings.

Ink Set

An ink set of this embodiment contains a white ink composition containing a white coloring material and a resin, and a non-white ink composition containing a non-white coloring material and a resin and is used with a treatment liquid containing a coagulant for coagulating the component of the non-white ink composition, in which, when a 5% by mass calcium acetate monohydrate aqueous solution and the ink composition are mixed, a ratio of a viscosity increase after the mixing to a viscosity increase before the mixing is lower in the white ink composition than in the non-white ink composition.

In the case where the white ink composition and the non-white ink composition (color) are printed while overlapping, when the coagulant of the treatment liquid is consumed by the white ink composition, the non-white ink composition cannot react with the treatment liquid, which poses a problem that the sharpness of the obtained recorded content decreases. To address the problem, the consumption of the coagulant by the white ink composition is suppressed by relatively reducing the reactivity (coagulation property) of the white ink composition, whereby the reaction of the non-white ink composition and the coagulant is ensured in this embodiment. Thus, the sharpness of the obtained recorded content can be ensured.

Depending on the adhesion order of the treatment liquid, the white ink composition, and the non-white ink composition to the recording medium, a treatment liquid array is disposed near a white ink composition array in the arrangement of nozzle arrays of an ink jet head in some cases. In this case, when the reactivity is lower in the white ink composition than in the non-white ink composition, an effect that clogging of white ink composition nozzles adjacent to each other due to scattering of mist of the treatment liquid is hard to occur is also obtained.

Furthermore, the white ink composition enables more rapid image formation by not only increasing the viscosity by a reaction with the treatment liquid but increasing the viscosity increase by drying. Therefore, in the case where the viscosity increase by drying of the white ink composition is higher than that of the non-white ink composition, even when the white ink composition and the treatment liquid are not allowed to positively react with each other, bleeding can also be reduced by increasing the viscosity by drying on a recording medium.

Ink Composition

The ink composition contains the white ink composition and the non-white ink composition and, when a 5% by mass calcium acetate monohydrate aqueous solution and the ink composition are mixed, a ratio of the viscosity increase after the mixing to the viscosity increase before the mixing (hereinafter also referred to as "ratio of viscosity increase by coagulant") is lower in the white ink composition than in the non-white ink composition. Thus, the sharpness of the obtained recorded content can be made excellent. The white ink used as a concealing layer is recorded as a solid pattern or the like and a larger amount of the white ink than the non-white ink is caused to adhere and used in many cases. Therefore, when the ratio of viscosity increase by coagulation of a white ink is large, the treatment liquid is considerably consumed by the white ink, so that the coagulation of the non-white ink does not sufficiently proceed in some cases. In this case, when the white ink and the non-white ink are recorded while overlapping, the white ink and the non-white ink are color-mixed in some cases, so that an image recorded with the non-white ink blurs with the white ink. Moreover, when the recorded content is viewed from the white ink side, the non-white ink on the opposite side appears to be color-mixed with the concealing layer of the white ink. The recorded content in which such a phenomenon is observed has poor sharpness. Thus, the ratio of viscosity increase by coagulation of the white ink is reduced to be lower than that of the non-white ink, whereby the sharpness of the recorded content can be made excellent.

In this embodiment, the ratio of viscosity increase by coagulant is measured as follows. First, the white ink composition or the non-white ink composition is mixed with a 5% by mass calcium acetate monohydrate aqueous solution in a mass ratio that the content of the white ink composition or the non-white ink composition is 10 g based on 1 g of the 5% by mass calcium acetate monohydrate aqueous solution, and then stirred for 10 seconds. Thus, the mixture ratio is a mass ratio of 1:10. After stirring, the viscosity is promptly measured. The ratio of viscosity increase by coagulant is calculated by the following expression from the obtained viscosity and the viscosity of the ink before the mixing. The ratio of viscosity increase by coagulant is a ratio of the viscosity of the ink after the mixing to the viscosity of the ink before the mixing. All the tests are performed at normal temperature and an E type viscometer is used as a viscometer. The stirring is performed so that the entire mixed liquid flows and is performed to such an extent that the liquid surface of the mixed liquid becomes a mortar shape using a magnetic stirrer, for example. The 5% by mass calcium acetate monohydrate aqueous solution is also referred to as a test liquid.

Ratio of viscosity increase by coagulant=Ink viscosity after mixing/Ink viscosity before mixing The ratio of viscosity increase by coagulant of the white ink composition is preferably 7.00 or less, more preferably 5.00 or less, still more preferably 3.00 or less, particularly preferably 2.50 or less, more particularly preferably 2.00 or less, and even more particularly preferably 1.50 or less. The lower limit is not limited and those causing no viscosity increase by mixing may be acceptable. Moreover, the ratio of viscosity increase by coagulant is 0.80 or more, preferably 1.00 or more, and more preferably 1.20 or more, for example.

Due to the fact that the ratio of viscosity increase by coagulant of the white ink composition is within the range mentioned above, there is a tendency that the color mixing of the white ink composition and the non-white composition ink is further suppressed and the abrasion resistance is further improved. Moreover, due to the fact that the ratio of viscosity increase by coagulant of the white ink composition is within the range mentioned above, there is a tendency that the discharge stability is further improved.

The ratio of viscosity increase by coagulant of the non-white ink composition is preferably 2.00 or more, more preferably 3.00 or more, still more preferably 3.50 or more, yet still more preferably 4.00 or more, particularly preferably 5.00 or more, and more particularly preferably 6.00 or more. The upper limit is not limited and is preferably 8.00 or less, more preferably 7.50 or less, still more preferably 7.00 or less, and particularly preferably 6.00 or less.

Due to the fact that the ratio of viscosity increase by coagulant of the non-white ink composition is within the range mentioned above, there is a tendency that the sharpness of the obtained recorded content is further improved and the abrasion resistance is further improved. Moreover, due to the fact that the ratio of viscosity increase by coagulant of the non-white ink composition is within the range mentioned above, there is a tendency that the discharge stability is further improved.

A difference in the ratio of viscosity increase by coagulant between the white ink composition and the non-white ink composition is preferably 2.00 or more. The difference is preferably 3.00 to 7.00, more preferably 3.50 to 6.50, and still more preferably 4.00 to 6.00. Due to the fact that the difference in the ratio of viscosity increase by coagulant is within or beyond the range mentioned above, there is a tendency that the sharpness of the obtained recorded content is further improved. Moreover, due to the fact that the difference in the ratio of viscosity increase by coagulant is within or below the range mentioned above, there is a tendency that the discharge stability is further improved.

The ratio of viscosity increase by coagulant of an ink can be adjusted by adjusting the type or the content of components which may affect the coagulation property contained in the ink, for example. As such components, the coloring material, the resin, and the like are mentioned. In that case, in the method for measuring the ratio of viscosity increase by coagulation of the ink described above, for example, the ratio of viscosity increase by coagulant of a resin dispersion liquid and a coloring material dispersion liquid used for preparing an ink in place of the ink may be measured when the measurement is similarly performed using the resin dispersion liquid and the coloring material dispersion liquid, and then the ratio of viscosity increases by coagulant of the resin dispersion liquid and the coloring material dispersion liquid ink may be adjusted, whereby the ratio of viscosity increase by coagulant of the ink prepared using the resin dispersion liquid and the coloring material dispersion liquid ink may be adjusted.

The ratio of viscosity increase by coagulant of the resin dispersion liquid can be adjusted by adjusting the type or the component ratio of monomers used for the synthesis of a resin or, when a resin is emulsified and dispersed, adjusting the type or the use amount of an emulsifier, for example. For example, the ratio of viscosity increase by coagulant of the resin can be reduced by reducing the acid value of the resin by using a large number of monomers having a low acid value or by increasing the use amount of the emulsifier. Examples of the monomers having a low acid value include monomers not having anionic groups, such as carboxyl groups and sulfone groups. The coagulation property of the resin dispersion liquid thus obtained may be confirmed by the above-described method, and then a resin dispersion liquid having a desired ratio of viscosity increase by coagulant may be selected and used.

The ratio of viscosity increase by coagulant of the coloring material can be adjusted by adjusting the amount of the anionic group mentioned above which the coloring material has on the surface or, when dispersed by covering at least one part of the coloring material by a resin, adjusting the type or the component ratio of monomers used for the synthesis of the resin. For example, a resin having a high coagulation property can be obtained by increasing the amount of the anionic group contained in the coloring material or increasing the acid value of the resin. When reversed, a coloring material having a low coagulation property can be obtained. The coagulation property of the coloring material thus obtained is confirmed by the above-described method, and then a coloring material having a desired coagulation property may be selected and used.

The ratio of viscosity increase in evaporating 50% by mass of the ink composition (hereinafter also referred to as "ratio of viscosity increase by drying") is preferably lower in the non-white ink composition than in the white ink composition. Thus, there is a tendency that the sharpness of the obtained recorded content is further improved. In this embodiment, the ratio of viscosity increase by drying is calculated by the following expression from the viscosity of an ink before drying and the viscosity when an ink is dried in a 40° C. open system, so that 50% by mass of the ink decreases. The ratio of viscosity increase by drying is a ratio of the viscosity of the ink after the drying to the viscosity of the ink before drying. The viscosity measurement is performed at normal temperature and an E type viscometer is used as a viscometer.

Ratio of viscosity increase by drying=Viscosity of ink after drying/Viscosity of ink before drying The lower limit of the ratio of viscosity increase by drying of the white ink composition is preferably 15.00 or more, more preferably 20.00 or more, and still more preferably 25.00 or more. The lower limit is preferably 35.00 to 60.00, more preferably 35.00 to 50.00, and still more preferably 37.50 to 45.00. When the ratio of viscosity increase by drying of the white ink composition is within or beyond the range, there is a tendency that the color mixing of the white ink composition and the non-white composition ink is further suppressed, the recording speed can be increased, and the abrasion resistance is further improved. Due to the fact that the ratio of viscosity increase by drying of the white ink composition is within or below the range, there is a tendency that the discharge stability is further improved.

The ratio of viscosity increase by drying of the non-white ink composition is preferably 30.00 or less. The lower limit is not limited and is 2.00 or more, for example. The lower limit is preferably 10.00 to 30.00, more preferably 15.00 to 25.00, and still more preferably 17.50 to 22.50. Due to the fact that the ratio of viscosity increase by drying of the non-white ink composition is within or beyond the range, there is a tendency that the sharpness of the obtained recorded content is further improved and the abrasion resistance is further improved. Due to the fact that the ratio of viscosity increase by drying of the non-white ink composition is within or below the range, there is a tendency that the discharge stability is further improved.

A difference in the ratio of viscosity increase by drying between the white ink composition and the non-white ink composition is preferably 10.00 or more. The difference is preferably 12.50 to 30.00, more preferably 15.00 to 25.00, and still more preferably 17.5.00 to 22.50. Due to the fact that the difference in the ratio of viscosity increase by drying is within or beyond the range, there is a tendency that the sharpness of the obtained recorded content is further improved. Moreover, due to the fact that the difference in the ratio of viscosity increase by drying is within or below the range, there is a tendency that the discharge stability is further improved.

The ratio of viscosity increase by drying of an ink can be adjusted by adjusting the content of the solid content contained in the ink, for example. As the solid content, the resin, the coloring material, and the like are mentioned. When the ratio of viscosity increase by drying of the ink varies also depending on the type of the resin or the coloring material contained in the ink, the ratio of viscosity increase by drying of the ink may be adjusted by changing the type of the resin or the coloring material contained in the ink. The ratio of viscosity increase by drying of the ink thus obtained is confirmed by the above-described method, and then an ink having a desired ratio of viscosity increase by drying may be selected and used.

Each ink composition used in this embodiment contains a coloring material and a solvent. Resin, wax, an antifoaming agent, and a surfactant can be compounded, as desired. The ink composition is preferably an aqueous ink composition containing resin particles and an organic solvent. For each ink composition, the same basic composition can be independently employed except the fact that the white ink contains a white coloring material and the non-white ink contains a non-white coloring material.

The content of the solid content of the white ink composition is preferably larger than that of the non-white ink composition and is preferably larger by 3 to 20% by mass, more preferably larger by 4 to 15% by mass, and still more preferably larger by 5 to 10% by mass. The content of the solid content of the white ink composition is preferably 10 to 25% by mass, more preferably 13 to 20% by mass, and still more preferably 14 to 18% by mass. The content of the solid content of the white ink composition is preferably 1 to 15% by mass, more preferably 2 to 13% by mass, and still more preferably 4 to 10% by mass. Hereafter, each component is described.

Coloring Material

Examples of the white coloring material include, but are not particularly limited to, white inorganic pigments, such as C.I. Pigment White 6, 18, and 21, titanium oxide, zinc oxide, zinc sulfide, antimony oxide, magnesium oxide, and zirconium dioxide; and white organic pigments, such as white hollow resin particles and polymer particles, for example. Among the above, it is preferable to use at least any one of metal oxides, such as titanium oxide, zinc oxide, antimony oxide, magnesium oxide, and zirconium dioxide, and the hollow resin particles. By the use of such a white coloring material, there is a tendency that the concealability is further improved and the sharpness of the obtained recorded content is further improved.

The content of the white coloring material is preferably 4 to 15% by mass, more preferably 6 to 15% by mass, and still more preferably 8 to 15% by mass based on the total amount of the white ink composition. Due to the fact that the content of the white coloring material is within the range mentioned above, there is a tendency that the concealability is improved and the image quality of the obtained recorded content is further improved.

Examples of the non-white coloring material include pigments and dyes other than the white coloring materials mentioned above. Examples of the pigments include inorganic pigments, such as carbon blacks (C.I. Pigment Black 7), such as furnace black, lamp black, acetylene black, and channel black and iron oxide; and organic pigments, such as a quinacridone-based pigment, a quinacridone-quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo pigment, a benzimidazolone-based pigment, an isoindolinone-based pigment, an azomethine-based pigment, and an azo-based pigment. Examples of the dyes include acidic dyes, such as C.I. Acid Yellow, C.I. Acid Red, C.I. Acid Blue, C.I. Acid Orange, C.I. Acid Violet, and C.I. Acid Black; basic dyes, such as C.I. Basic Yellow, C.I. Basic Red, C.I. Basic Blue, C.I. Basic Orange, C.I. Basic Violet, and C.I. Basic Black; direct dyes, such as C.I. Direct Yellow, C.I. Direct Red, C.I. Direct Blue, C.I. Direct Orange, C.I. Direct Violet, and C.I. Direct Black, reactive dyes, such as C.I. Reactive Yellow, C.I. Reactive Red, C.I. Reactive Blue, a C.I. Reactive Orange, C.I. Reactive Violet, and C.I. Reactive Black; and disperse dyes, such as C.I. Disperse Yellow, C.I. Disperse Red, C.I. Disperse Blue, C.I. Disperse Orange, C.I. Disperse Violet, and C.I. Disperse Black. The coloring materials may be used alone or in combination of two or more kinds thereof.

The content of the non-white coloring material is preferably 0.1 to 10% by mass, more preferably 0.5 to 7% by mass, and still more preferably 1.0 to 4% by mass based on the total amount of the non-white ink composition. Due to the fact that the content of the non-white coloring material is within the range mentioned above, there is a tendency that the sharpness of the obtained recorded content is further improved.

The pigment content of the white ink composition is preferably larger than the pigment content of the non-white ink composition. Thus, there is a tendency that the concealability by the white ink composition is further improved and the sharpness of the obtained recorded content is further improved. From this viewpoint, the content of the white coloring material to the content of the non-white coloring material is preferably 1.1 to 6 times and more preferably 1.5 to 5 times.

When the coloring material is a pigment, the pigment can be used in a state of a pigment dispersion liquid. The pigment dispersion liquid may also contain a dispersant as desired besides the pigment and the solvent. As the solvent, hydrophilic solvents, such as water and diethylene glycol, are mentioned. As the dispersant, a styrene acrylic acid copolymer is mentioned. Although not particularly limited, the acid value of the dispersant is preferably 20 mgKOH/g or more, more preferably 50 mgKOH/g or more, and still more preferably 80 mgKOH/g or more from the viewpoint of the dispersibility. The upper limit of the acid value of the dispersant is not particularly limited and is 250 mgKOH/g or less.

Solvent

As the solvent, water and an organic solvent are mentioned. The content of water is preferably 50 to 80% by mass, more preferably 55 to 75% by mass, and still more preferably 60 to 70% by mass based on the total amount of the ink composition. The ink composition is preferably an aqueous ink composition. The "aqueous composition" means a composition containing at least water as a main solvent component of the composition.

The organic solvent is not particularly limited and specifically alcohols or glycols, such as glycerol, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene-glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene-glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol, are mentioned. The organic solvents may be used alone or in combination of two or more kinds thereof.

The content of the organic solvent is preferably 5 to 40% by mass, more preferably 10 to 35% by mass, and still more preferably 15 to 30% by mass based on the total amount of the ink composition.

Nitrogen Containing Solvent

As the organic solvent, it is also preferable to use a nitrogen containing solvent. Due to the fact that the nitrogen containing solvent is contained, there is a tendency that the abrasion resistance is further improved even when the heating temperature is low by an effect of promoting softening of resin particles of the nitrogen containing solvent. As the nitrogen containing solvent, an amide-based solvent is mentioned. As the amide-based solvent, a cyclic amide-based solvent and a noncyclic amide-based solvent are mentioned and are preferable. As the cyclic amide-based solvent, the following pyrrolidone type and the like are mentioned. As the noncyclic amide-based solvent, the following amide ether-based solvents are mentioned.

Examples of the nitrogen containing solvent include, but are not particularly limited to, a pyrrolidone-based solvent, an imidazolidinone-based solvent, an amide ether-based solvent, a pyridine-based solvent, a pyrazine-based solvent, and a pyridone-based solvent. The pyrrolidone-based solvent and the amide ether-based solvent are preferable and 2-pyrrolidone, N-methyl-2-pyrrolidone, and N-ethyl-2-pyrrolidone are mentioned, for example. Examples of the amide ether-based solvent include 3-methoxy-N,N-dimethyl propane amide, 3-butoxy-N,N-dimethyl propane amide, and the like. The nitrogen containing solvents may be used alone or in combination of two or more kinds thereof.

From the viewpoint described above, the content of the nitrogen containing solvent is preferably 3 to 25% by mass, more preferably 5 to 23% by mass, and still more preferably 10 to 21% by mass based on the total amount of the ink composition.

The content of the organic solvent other than the nitrogen containining solvent is preferably 1 to 20% by mass, more preferably 5 to 20% by mass, and still more preferably 6 to 15% by mass.

As the organic solvent, those having a normal boiling point of 180 to 280° C. are preferably contained, those having a normal boiling point of 200 to 260° C. are more preferably contained, and those having a normal boiling point of 210 to 250° C. are still more preferably contained. This case is preferable in the point that the sharpness, the prevention of color mixing, and the abrasion resistance of an image, discharge stability, and the like are enhanced.

With respect to the organic solvent, the content of one having a normal boiling point of more than 280° C. is preferably 1% by mass or less, more preferably 0.5% by mass or less, and still more preferably 0.1% by mass or less based on the ink and the lower limit may be 0% by mass. This case is preferable in the point that the sharpness, the prevention of color mixing, the abrasion resistance, and the like of an image are enhanced.

Resin

As the resin, those which are dissolved in the ink composition or those which are dispersed in the form of an emulsion or fine particles are mentioned. By the use of such a resin, there is a tendency that recorded content that has better abrasion resistance is obtained. In particular, such a resin tends to contribute to an improvement of a binding property (abrasion resistance) of a recording medium and an ink coating film. Examples of such a resin include, but are not particularly limited to, an acrylic resin, a vinyl acetate resin, a vinyl chloride resin, a butadiene resin, a styrene resin, a polyester resin, a crosslinked acrylic resin, a crosslinked styrene resin, a benzoguanamine resin, a phenol resin, a silicone resin, an epoxy resin, an urethane resin, a paraffin resin, a fluororesin, a water-soluble resin, and copolymers obtained by combining monomers configuring the resins, for example. Examples of the copolymers include, but are not particularly limited to, a styrene butadiene resin and a styrene acrylic resin, for example. Moreover, polymer lattices containing the resins are usable as the resin. For example, polymer lattices containing fine particles of an acrylic resin, a styrene acrylic resin, a styrene resin, a crosslinked acrylic resin, and a crosslinked styrene resin are mentioned. The resins may be used alone or in combination of two or more kinds thereof.

The acrylic resin is a resin which is a homopolymer or a copolymer obtained by performing polymerization using at least acrylic monomers as monomers. Examples of the acrylic monomers include (meth)acrylate, (meth)acrylic acid, acryl amide, acrylonitrile, and the like. When the acrylic resin is a copolymer, an acryl-vinyl resin and the like using vinyl-based monomers as the other monomers are mentioned and a styrene acrylic resin using styrene as the vinyl-based monomers and the like are mentioned.

As the resin, an acrylic resin, a urethane resin, a polyester resin, and the like are preferable in the point that the resins are easily available and are easily obtained as a resin having a desired property.

The acid value of the resin is preferably 1 to 25 mgKOH/g, more preferably 3 to 15 mgKOH/g, and still more preferably 5 to 10 mgKOH/g from the viewpoint of the coagulation property. The acid value of the resin contained in the white ink composition is preferably less than 20 mgKOH/g, more preferably 15 mgKOH/g or less, and still more preferably 10 mgKOH/g or less and the lower limit is 0 mgKOH/g or more. The acid value of the resin contained in the non-white ink composition is preferably 20 mgKOH/g or more, more preferably 25 mgKOH/g or more, and still more preferably 30 mgKOH/g or more and the upper limit is not limited and, for example, is 250 mgKOH/g or less.

The content of the resin is preferably 1 to 12.5% by mass, more preferably 2 to 10% by mass, and still more preferably 3 to 7.5% by mass based on the total amount of the ink composition. Due to the fact that the content of the resin is 1% by mass or more, there is a tendency that the abrasion resistance is further improved as described above. Moreover, due to the fact that the content of the resin is 12.5% by mass or less, there is a tendency that the viscosity of the ink decreases, so that the discharge stability is excellent and the clogging recoverability is excellent.

Wax

Wax may be used as the resin. Examples of the wax include those which are dissolved in the ink composition or dispersed in the form of an emulsion or fine particles. By the use of such wax, there is a tendency that recorded content that has better abrasion resistance is obtained. In particular, there is a tendency that the wax contributes to an improvement of the abrasion resistance by being unevenly distributed in the surface of an ink coating film (interface between air and the ink coating film) on a recording medium. Examples of such wax include, but are not particularly limited to, ester wax of higher fatty acid and higher monohydric alcohol or dihydric alcohol (preferably monohydric alcohol), paraffin wax, microcrystalline wax, olefin wax, or a mixture thereof, for example.

The content of the wax is preferably 0.1 to 5% by mass, more preferably 0.2 to 4% by mass, and still more preferably 0.3 to 3% by mass based on the total amount of the ink composition. Due to the fact that the content of the wax is 0.1% by mass or more, there is a tendency that the abrasion resistance is further improved as described above. Moreover, due to the fact that the content of the wax is 5% by mass or less, there is a tendency that the viscosity of the ink decreases, so that the discharge stability is excellent and the clogging recoverability is excellent.

Surfactant

Examples of the surfactant include, but are not particularly limited to, acetylene glycol-based surfactants, fluorine-based surfactants, and polysiloxane-based surfactants, for example.

The acetylene glycol-based surfactants are not particularly limited and are preferably one or more kinds selected from 2,4,7,9-tetramethyl-5-decyne-4,7-diol and an alkylene oxide adduct of 2,4,7,9-tetramethyl-5-decyne-4,7-diol and 2,4-dimethyl-5-decyne-4-ol and an alkylene oxide adduct of 2,4-dimethyl-5-decyne-4-ol, for example. Examples of commercially-available items of the acetylene glycol-based surfactants include, but are not particularly limited to, Olefin 104 series, E series, such as Olefin E1010, Surfynol 465, and Surfynol 61 (Trade Names, manufactured by Nissin Chemical Industry CO., Ltd.) and the like, for example. The acetylene glycol-based surfactants may be used alone or in combination of two or more kinds thereof.

Examples of the fluorine-based surfactants include, but are not particularly limited to, perfluoroalkyl sulfonate, a perfluoroalkyl carboxylate salt, perfluoroalkyl phosphate ester, a perfluoroalkyl ethylene oxide adduct, perfluoroalkyl betaine, and a perfluoroalkyl amine oxide compound, for example. Examples of commercially-available items of the fluorine-based surfactant include, but are not particularly limited to, S-144 and S-145 (manufactured by Asahi Glass Co., Ltd.); FC-170C, FC-430, and Fluorad FC4430 (manufactured by Sumitomo 3M, Inc.); FSO, FSO-100, FSN, FSN-100, and FS-300 (manufactured by Dupont); FT-250 and 251 (manufactured by Neos Co., Ltd.), and the like, for example. The fluorine-based surfactants may be used alone or in combination of two or more kinds thereof.

Examples of the silicone-based surfactants include a polysiloxane-based compound, polyether-modified organosiloxane, and the like. Commercially-available items of the silicone-based surfactant are not particularly limited and specifically, BYK-306, BYK-307, BYK-333, BYK-341, BYK-345, BYK-346, BYK-347, BYK-348, and BYK-349 (all Trade Names, manufactured by BYK Chemie Japan, Inc.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all Trade Names, manufactured by Shin-Etsu Chemical Co., Ltd.), and the like are mentioned.

The content of the surfactant is preferably 0.1 to 3% by mass, more preferably 0.2 to 2% by mass, and still more preferably 0.3 to 1.5% by mass based on the total amount of the ink composition.

Antifoaming Agent

Examples of the antifoaming agent include, but are not particularly limited to, a silicone-based antifoaming agent, a polyether-based antifoaming agent, a fatty acid ester-based antifoaming agent, and an acetylene glycol-based antifoaming agent, for example. Examples of commercially-available items of the antifoaming agent include BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (all Trade Names, manufactured by BYK Chemie Japan, Inc.), Surfynol DF37, DF110D, DF58, DF75, DF220, and MD-20, and Enviro Gem ADO1 (all Trade Names, manufactured by Nissin Chemical Industry Co., Ltd.). The antifoaming agents may be used alone or in combination of two or more kinds thereof.

The content of the antifoaming agent is preferably 0.03 to 0.7% by mass, more preferably 0.05 to 0.5% by mass, and still more preferably 0.08 to 0.3% by mass based on the total amount of the ink composition.

Other Components

In addition, the ink composition used in this embodiment may also contain various additives, such as a dissolution assistant, a viscosity adjuster, a pH adjuster, an antioxidant, an antiseptic, an antifungal agent, a corrosion inhibitor, and a chelating agent for capturing metal ions affecting dispersion as desired.

Treatment Liquid

A treatment liquid is not particularly limited insofar as a coagulant for coagulating the component of the ink composition is contained. Water, an organic solvent, an antifoaming agent, and a surfactant may be contained as desired. An aqueous treatment liquid is preferable. The ink set of this embodiment is used with the treatment liquid but the treatment liquid may be contained in the ink set. Components which may be contained other than the coagulant of the treatment liquid can be contained independently of those contained in an ink as the type of those other than the coloring material of the components which may be contained in the ink, the content thereof, and the like. The treatment liquid is not a composition used for coloring a recording medium. The content of a coloring material of the treatment liquid is preferably 0.1% by mass or less, more preferably 0.05% by mass or less, and still more preferably 0.01% by mass or less and the lower limit is 0.00% by mass.

Coagulant

The coagulant is not particularly limited insofar as the components of the non-white ink composition are coagulated. For example, a polyvalent metal salt, an organic acid or a salt thereof, and a cationic compound are mentioned. By the use of such a coagulant, there is a tendency that the coagulation property is further improved. The coagulants may be used alone or in combination of two or more kinds thereof. The coagulant may be one further coagulating the component of the white ink composition.

Examples of the polyvalent metal salt include, but are not particularly limited to, polyvalent metal salts of inorganic acids or polyvalent metal salts of organic acids, for example. Examples of the polyvalent metals include, but are not particularly limited to, alkaline-earth metals of Group 2 of the periodic table (for example, magnesium and calcium), transition metals of Group 3 of the periodic table (for example, lanthanum), and earth metals (for example, aluminum) and lanthanides (for example, neodymium) of Group of the periodic table, for example. As salts of the polyvalent metals, carboxylates (formic acid, acetic acid, benzoic acid salt, and the like), sulfates, nitrates, chlorides, and thiocyanates are suitable. Among the above, calcium salts or magnesium salts of carboxylic acids (formic acid, acetic acid, benzoic acid salt, and the like), calcium salts or magnesium salts of sulfuric acid, calcium salts or magnesium salts of nitric acid, calcium chloride, magnesium chloride, and calcium salts or magnesium salts of thiocyanic acid are preferably mentioned. The polyvalent metal salts may be used alone or in combination of two or more kinds thereof.

Examples of the organic acid include, but are not particularly limited to, acetic acid, phosphoric acid, oxalic acid, malonic acid, and citric acid, for example. Among the above, monovalent or divalent or more carboxylic acids are preferable. The organic acid may be in a salt state. The organic acids or salts thereof may be used alone or in combination of two or more kinds thereof. Those which are organic acids or salts thereof and polyvalent metal salts are included in the polyvalent metal salt.

Examples of the cationic compound include, but are not particularly limited to, an amine-based resin, for example. The amine-based resin may be a resin having an amino group in the structure. Amine-based resins, such as an amine-epichlorohydrin condensation polymer, polyallylamine, and a polyallylamine derivative, are mentioned. The cationic compound is preferably a resin soluble in the treatment liquid or one which is dispersed in the treatment liquid in a state of a resin emulsion or the like and the former is more preferable.

The content of the coagulant is preferably 1 to 10% by mass, more preferably 3 to 10% by mass, and still more preferably 3 to 7% by mass based on the total amount of the treatment liquid. Due to the fact that the content of the coagulant is within the range mentioned above, there is a tendency that the bleeding resistance, the filling property, and the abrasion resistance of the obtained recorded content are enhanced.

Water

The content of water is preferably 55 to 85% by mass, more preferably 60 to 80% by mass, and still more preferably 65 to 75% by mass based on the total amount of the treatment liquid.

Organic Solvent

As the organic solvent contained in the treatment liquid, the same substances as those described in the ink composition can be used. The organic solvents may be used alone or in combination of two or more kinds thereof. The content of the organic solvent is preferably 10 to 40% by mass, more preferably 15 to 35% by mass, and still more preferably 20 to 30% by mass based on the total amount of the treatment liquid.

Moreover, the treatment liquid may contain a nitrogen containing-based solvent as the organic solvent. The content of the nitrogen containing solvent is preferably to 25% by mass, more preferably 5 to 22% by mass, and still more preferably 8 to 20% by mass based on the total amount of the treatment liquid. As the nitrogen containing solvent, the nitrogen containing solvent which may be contained in the ink composition described above can be used independently of the nitrogen containing solvent contained in the ink composition.

Surfactant

As the surfactant contained in the treatment liquid, the same substances as those described in the ink composition can be used. The content of the surfactant is preferably 0.1 to 3% by mass, more preferably 0.2 to 2% by mass, and still more preferably 0.3 to 1.5% by mass based on the total amount of the treatment liquid. Due to the fact that the content of the surfactant is within the range mentioned above, there is a tendency that the wettability of the treatment liquid is further improved.

Antifoaming Agent

As the antifoaming agent contained in the treatment liquid, the same substances as those described in the ink composition can be used. The content of the antifoaming agent is preferably 0.03 to 0.7% by mass, more preferably 0.05 to 0.5% by mass, and still more preferably 0.08 to 0.3% by mass based on the total amount of the treatment liquid.

Recording Method

A first recording method of this embodiment is a recording method which uses a white ink composition containing a white coloring material and a resin, a non-white ink composition containing a non-white coloring material and a resin, and a treatment liquid containing a coagulant for coagulating the component of the non-white ink composition, in which, when a 5% by mass calcium acetate monohydrate aqueous solution and the ink composition are mixed, a ratio of the viscosity increase after the mixing to the viscosity increase before the mixing is lower in the white ink composition than in the non-white ink composition, and which includes a treatment liquid adhesion process of causing the treatment liquid to adhere to a recording medium, a non-white ink adhesion process of causing the non-white ink composition to adhere to the recording medium, and a white ink adhesion process of causing the white ink composition to adhere to the recording medium.

According to such a recording method, the recording method can be further improved in sharpness. As the treatment liquid, the treatment liquid described above is usable. In the case of one in which, when a 5% by mass calcium acetate monohydrate aqueous solution and the ink composition are mixed, a ratio of the viscosity increase after the mixing to the viscosity increase before the mixing is lower in the white ink composition than in the non-white ink composition, the consumption of the coagulant by the white ink can be suppressed, and thus the coagulation of the non-white ink can sufficiently progress, so that excellent sharpness is obtained also in the recording method using the treatment liquid described above.

As the recording method, both a serial system and a line system are usable.

Treatment Liquid Adhesion Process

The treatment liquid adhesion process is a process of causing the treatment liquid containing the coagulant for coagulating the component of the ink composition to adhere to a recording medium. The treatment liquid is caused to adhere at least to a region to which the ink composition adheres or a region to which the ink composition is caused to adhere. Due to the fact that the treatment liquid adhesion process is included, the components of the ink composition coagulate on the surface of a recording medium. As a method for causing the treatment liquid to adhere, the treatment liquid may be applied using a bar coater, a roll coater, a spray, or the like besides a method for causing the treatment liquid to adhere using an ink jet system as with an ink adhesion process described later. As the ink jet system, the same method as a discharge method of the ink composition can be used.

The treatment liquid adhesion process may be performed before the ink adhesion process or may be performed after the ink adhesion process. When the treatment liquid adhesion process is performed before the ink adhesion process, the ink adhesion process may be performed before the treatment liquid dries or the ink adhesion process may be performed after the treatment liquid dries. In this case, the interval from the adhesion of the treatment liquid to the adhesion of the ink composition is preferably within 20 seconds. When the treatment liquid adhesion process is performed after the ink adhesion process, the treatment liquid adhesion process is preferably performed before the ink composition dries.

It is preferable to perform the treatment liquid adhesion process simultaneously with the white ink adhesion process or between the white ink adhesion process and the non-white ink adhesion process in the point that sharpness and the like are enhanced.

It is preferable to arrange a treatment liquid nozzle group used for recording on the downstream side relative to or a portion overlapping a white ink composition nozzle group used for recording and to arrange a non-white ink nozzle group used for recording on the downstream side relative to the treatment liquid nozzle group used for recording. This case is preferable in the point that the sharpness is enhanced.

In at least one part of a recording region to which the ink compositions and the treatment liquid are caused to adhere, the adhesion amount of the treatment liquid is preferably 5 to 30% by mass, more preferably 7 to 25% by mass, and still more preferably 10 to 20% by mass based on the adhesion amount of the ink composition. Due to the presence of a region having such an adhesion amount, there is a tendency that the image quality of the obtained recorded content is further improved. Furthermore, it is also preferable in the point described above that the maximum adhesion amount of the treatment liquid based on the adhesion amount of the ink compositions is within the range mentioned above in the recording region to which the ink compositions and the treatment liquid are caused to adhere.

Ink Adhesion Process

The non-white ink adhesion process is a process of causing the non-white ink composition to adhere to a recording medium. The white ink adhesion process is a process of causing the white ink composition to adhere to a recording medium. The ink compositions may be discharged from ink jet heads to be caused to adhere to a recording medium in both processes. Herein, the ink jet head is a head discharging the ink compositions to a recording medium to perform recording. The head has a cavity discharging the accommodated ink composition from a nozzle, a discharge actuator giving driving force for discharging to the ink composition, and a nozzle discharging the ink composition to the outside of the head. The discharge actuator can be formed using an electromechanical conversion element, such as a piezoelectric element changing the capacity of the cavity by mechanical deformation, an electrothermal conversion element of generating bubbles in an ink by generating heat to discharge the ink, or the like.

In at least one part of the recording region to which the ink compositions and the treatment liquid are caused to adhere, the adhesion amount of the white ink composition and the adhesion amount of the non-white ink composition each are independently preferably 5 to 30 mg/inch$^2$, more preferably 7 to 25 mg/inch$^2$, and still more preferably 10 to 20 mg/inch$^2$. The presence of a region having such an adhesion amount is preferable in the point that useful recorded content is recorded. Furthermore, it is also preferable in the point described above that the maximum adhesion amount of each ink composition is within the range mentioned above in the recording region to which the ink compositions and the treatment liquid are caused to adhere.

The treatment liquid adhesion process, the white ink adhesion process, and the non-white ink adhesion process are preferably processes of performing main scanning of discharging the treatment liquid, the white ink composition, or the non-white ink composition from the ink jet head while changing a position of the carriage carrying the ink jet head relative to the recording medium in the scanning direction to cause the same to adhere to the recording medium. More specifically, the ink jet head is preferably a serial head. According to a serial system using the serial head, the head is moved along the main scanning direction (transverse direction, width direction of the recording medium), and then ink droplets are discharged from a nozzle opening of the head interlocking with the movement, whereby an image can be recorded on the recording medium. Then, the recording medium is gradually moved along the subscanning direction (longitudinal direction, transportation direction of the recording medium) crossing the main scanning direction, and then the relative position of the recording medium is changed, whereby the recording is advanced. The recording method of the serial system is preferable in the point that, even when a line head used in a recording method of a line system described later is not used, recording on a recording medium which is wide in the width direction is enabled.

The ink jet head has the treatment liquid nozzle group discharging the treatment liquid, the white ink composition nozzle group discharging the white ink composition, and the non-white ink composition nozzle group discharging the non-white ink composition. The nozzle group performing discharging means a nozzle group used for recording in the recording method. In performing the main scanning, when it is supposed that there is an image to be recorded in a region of a recording medium facing the nozzle group, the nozzle group performing discharging is a group of nozzles which may discharge an ink or the like from the nozzles and is a nozzle group continuing in the subscanning direction. Therefore, a nozzle group not used for recording in the recording method, although the nozzle group itself is present, is not included in the nozzle group performing discharge.

When the non-white ink is recorded on the white ink, the non-white ink composition nozzle group used for recording is preferably arranged on the downstream side in the transportation direction relative to the white ink composition nozzle group used for recording. Thus, there is a tendency that the sharpness of the obtained recorded content is further improved and color mixing is suppressed.

Figure 4:
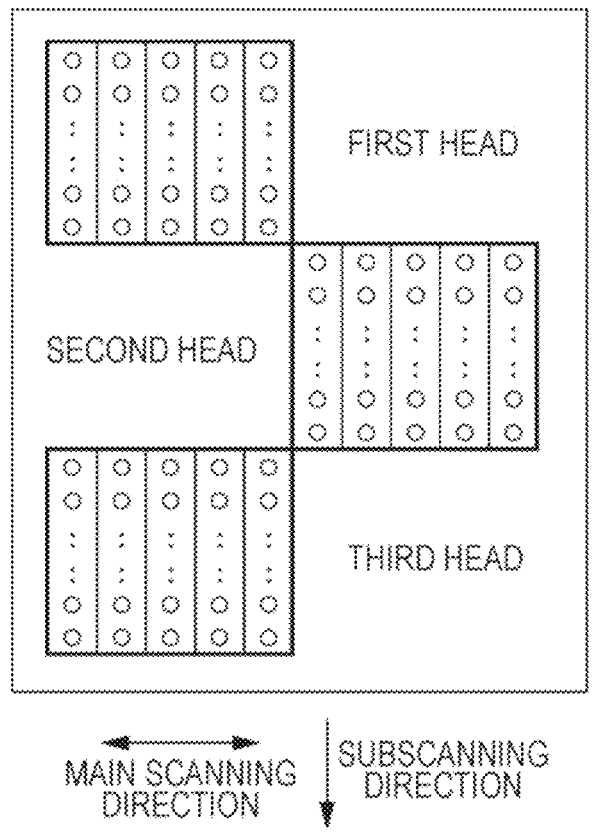
FIG. 4 is a schematic view illustrating another arrangement of the nozzle groups of the ink jet heads used in this embodiment.
Figure 5:
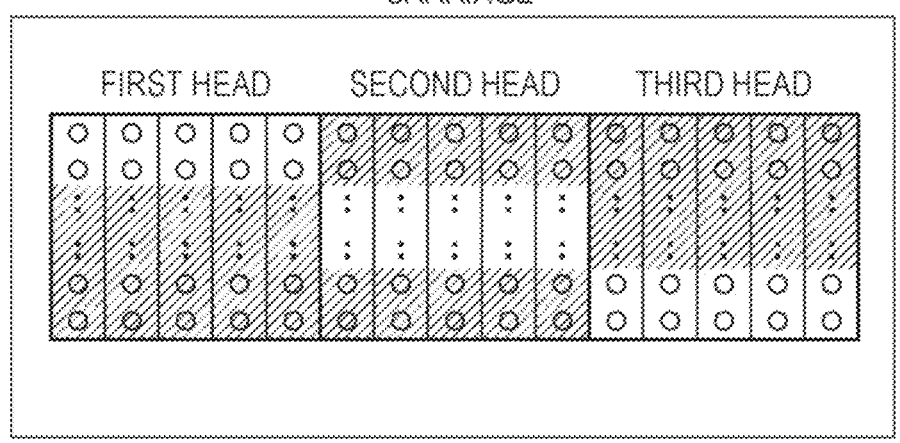
FIG. 5 is a schematic view illustrating still another arrangement of the nozzle groups of the ink jet heads used in this embodiment.

FIGS. 4 and 5 illustrate examples of the arrangement of nozzle arrays of the ink jet heads. In FIG. 4, a first head, a second head, and a third head are disposed from the upstream side to the downstream side in the transportation direction (subscanning direction). For example, when a white ink is charged into one of nozzle groups of the second head and a non-white ink is charged into one of nozzle groups of the third head, and then the nozzle groups are used for recording, the non-white ink composition nozzle group is arranged on the downstream side in the transportation direction relative to the white ink composition nozzle group. As illustrated in FIG. 5, heads may be configured so that the heads are arranged in order in the transportation direction by charging a white ink into one of nozzle groups of a second head and charging a non-white ink into one of nozzle groups of a third head among horizontally arranged heads and not using nozzle groups of shaded portions for recording and using nozzle groups of portions other than the shaded portions for recording, and the non-white ink composition nozzle groups may be arranged on the downstream side in the transportation direction relative to the white ink composition nozzle groups.

FIGS. 1A to 1F schematically illustrate various forms of the arrangement of the nozzle arrays of the ink jet head. In examples of FIGS. 1B, 1C, 1E, and 1F, a nozzle group W for the white ink composition has a projection L located on the upstream side in the transportation direction relative to non-white ink composition nozzle groups C1 to C4 as illustrated in FIG. 1C. By the use of the projection L for recording, the non-white ink composition nozzle groups are arranged on the downstream side in the transportation direction relative to the white ink composition nozzle group, and thus the white ink composition adheres to a recording medium before the non-white ink compositions. Moreover, as illustrated in FIG. 1C, the non-white ink composition nozzle groups have projections N located on the downstream in the transportation direction relative to the white ink composition nozzle group. By the use of the projections N for recording, the non-white ink composition nozzle groups of the portions are arranged on the downstream side in the transportation direction relative to the white ink composition nozzle group, and thus the white ink composition adheres to a recording medium before the non-white ink compositions.

In the examples of FIGS. 1B, 1C, 1E, and 1F, with respect to the nozzle groups of portions M where the positions in the transportation direction are overlapped among the white ink composition nozzle group and the non-white ink composition nozzle groups, it is preferable to partially use the nozzle groups of the portions for recording of either the white ink or the non-white inks or not use the nozzle groups of the portions for recording to thereby prevent the generation of a portion where the nozzle groups used for the recording are overlapped in the transportation direction. Thus, the sharpness, the color mixing resistance, and the like can be improved.

Also when the head configuration examples of FIGS. 1A and 1B are used, the non-white ink composition nozzle groups used for recording can be arranged on the downstream side in the transportation direction relative to the white ink composition nozzle group used for recording by providing nozzle groups not used for recording. It is the same as the example of FIG. 5. With respect to the white nozzle group and the non-white nozzle groups, the examples of FIGS. 1C and 1F are preferable in the point that a larger number of the non-white ink composition nozzle groups can be arranged on the downstream side in the transportation direction relative to the white ink composition nozzle group and the recording speed increases as compared with FIGS. 1B and 1E. On the other hand, the examples of FIGS. 1A and 1D are preferable in the point that the length in the subscanning direction of the entire head to be mounted on the carriage can be reduced as compared with the examples of FIGS. 1B and 1E.

The treatment liquid nozzle group used for recording is preferably arranged on the upstream side relative to or a portion overlapping the white ink composition nozzle group used for recording. Thus, there is a tendency that the sharpness of the obtained recorded content is further improved and the color mixing is suppressed. With respect to the "position on the upstream side", when a portion where a treatment liquid nozzle group R projects to the upstream side in the subscanning direction relative to ink nozzle groups in FIG. 1D is used for recording, for example, the portion is the position on the upstream side. Thus, the treatment liquid adheres to a recording medium before the white ink composition corresponding to the projection in the transportation direction.

The "overlapped portion" refers to a portion where a composition A nozzle group used for recording and a composition B nozzle group used for recording are located at the same position in the subscanning direction. Thus, the composition A adheres to a recording medium while overlapping the composition B in the same main scanning. For example, when the nozzle groups of the projection L of FIG. 1C are set as nozzle groups, the treatment liquid and the white ink of which are used for recording, the nozzle groups is referred to as a portion where the white ink and the treatment liquid overlap each other.

In FIGS. 1A to 1F, by providing a nozzle group not used for recording, the treatment liquid nozzle group used for recording can also be arranged on the upstream side in the transportation direction relative to or a portion overlapping the white ink composition nozzle group used for recording. Moreover, in FIGS. 1A to 1F, by providing a nozzle group not used for recording, the treatment liquid nozzle group used for recording can also be arranged on the upstream side in the transportation direction relative to or a portion overlapping the non-white ink composition nozzle group used for recording.

In the example of FIG. 4, the treatment liquid is charged into one of the nozzle groups of the first head and the white ink is charged into one of the nozzle groups of the second head, for example, and the nozzle groups are used for recording, whereby the treatment liquid nozzle group used for recording can be arranged on the upstream side relative to the white ink composition nozzle group used for recording. In the example of FIG. 5, the treatment liquid is charged into one of the nozzle groups of the first head and the white ink is charged into one of the nozzle groups of the second head, for example, and then nozzle groups not used for recording are set as appropriate, whereby the treatment liquid nozzle group used for recording can be arranged on the upstream side relative to or a portion overlapping the white ink composition nozzle group used for recording.

In the adhesion process, it is preferable to arrange the non-white ink composition nozzle group used for recording on the downstream side in the transportation direction relative to the white ink composition nozzle group used for recording and to arrange the treatment liquid nozzle group used for recording on the upstream side in the transportation direction relative to or a portion overlapping the white ink composition nozzle group used for recording. These cases are preferable in the point that the discharge stability of the non-white ink is enhanced. In the case of the recording method of the serial system, mist of the treatment liquid scatters in the main scanning direction of the treatment liquid nozzle group used for recording by the main scanning in some cases. According to the configuration described above, the non-white ink nozzle group used for recording is positioned further away from the treatment liquid nozzle group used for recording in the transportation direction than the white ink nozzle group used for recording, which can prevent a situation in which the treatment liquid mist flies to the non-white ink nozzle group to react with the ink to be a foreign substance in the nozzle, so that the discharge stability decreases. Moreover, due to the fact that the viscosity increase in mixing the treatment liquid is lower in the white ink than in the non-white ink, a situation in which the ink reacts with the flying treatment liquid in the white ink nozzle group to be a foreign substance, so that the discharge stability decreases can be suppressed. Also in the recording method of the line system described later, the nozzle groups used for recording are configured in the same manner while defining the transportation direction (subscanning direction) in the case of the recording medium of the serial system as the transportation direction, whereby the same configuration is achieved with respect to the distance in the transportation direction, and thus the configuration is preferable in the same point.

It is preferable to arrange the non-white ink composition nozzle group used for recording on one side in the main scanning direction relative to the white ink composition nozzle group used for recording and to arrange the treatment liquid nozzle group used for recording on the other side in the main scanning direction relative to the white ink composition nozzle group used for recording. This case is preferable in the point that the discharge stability of the non-white ink is much better. Due to the fact that the mist of the treatment liquid slightly scatters also in the subscanning direction and the position of the non-white ink nozzle group is located at a position further away from the position of the treatment liquid nozzle group also in the main scanning direction, it is presumed that the discharge stability is much better.

Since the white ink hardly coagulates and is hardly thickened, the discharge stability can be excellent also in any configuration.

It is more preferable to arrange the white ink composition nozzle group used for recording on the upstream side in the transportation direction relative to the non-white ink composition nozzle group used for recording and to arrange the treatment liquid nozzle group used for recording on the upstream side in the transportation direction relative to the non-white ink composition nozzle group used for recording in the point that the sharpness is enhanced. In this case, the treatment liquid nozzle group used for recording can be arranged in any one of the upstream side in the transportation direction relative to, a portion overlapping, or on the downstream side relative to the white ink composition nozzle group used for recording and either the overlapped portion or the downstream side is more preferable in the point that the sharpness is enhanced.

More specifically, the same configuration can be achieved by setting a nozzle group not used for recording instead of arranging the nozzle groups themselves as illustrated in FIG. 4. Also when the white ink is recorded on the non-white ink and the white ink is recorded on the non-white ink and further the non-white ink is recorded, the same configuration can be achieved by replacing inks to be charged into the head or setting a nozzle group not used for recording according to the recording order.

The order of each process which can be configured as described above is not particularly limited and the following configurations can be mentioned as the basic configuration, for example. The symbol "/" indicates that the white ink composition and the non-white ink composition are caused to adhere to a recording medium in order in the right direction from a recording medium.

Recording medium/White ink composition/Non-white ink composition

Recording medium/Non-white ink composition/White ink composition

Recording medium/Non-white ink composition/White ink composition/Non-white ink composition Then, the treatment liquid can be caused to adhere before, after, or simultaneously with the white ink composition and the non-white ink composition in the basic configurations. As an example, the following orders are mentioned. The symbol "/" indicates that the white ink composition, the non-white ink composition, and the treatment liquid are caused to adhere in order. The symbol "+" indicates that the white ink composition, the non-white ink composition, and the treatment liquid are simultaneously caused to adhere using the nozzle groups in an overlapped portion for recording.

Recording medium/Treatment liquid/White ink composition/Non-white ink composition Recording medium/Treatment liquid+White ink composition/Non-white ink composition Recording medium/Treatment liquid/White ink composition/Treatment liquid/Non-white ink composition Recording medium/Treatment liquid+White ink composition/Treatment liquid/Non-white ink composition Recording medium/Treatment liquid/White ink composition/Treatment liquid+Non-white ink composition Recording medium/Treatment liquid+white ink composition/Treatment liquid+Non-white ink composition Recording medium/Treatment liquid/Non-white ink composition/White ink composition Recording medium/Treatment liquid+Non-white ink composition/White ink composition Recording medium/Treatment liquid/Non-white ink composition/Treatment liquid/White ink composition Recording medium/Treatment liquid+Non-white ink composition/Treatment liquid/White ink composition Recording medium/Treatment liquid/Non-white ink composition/Treatment liquid+White ink composition Recording medium/Treatment liquid+Non-white ink composition/Treatment liquid+White ink composition Recording medium/White ink composition/Treatment liquid/Non-white ink composition Recording medium/White ink composition+Treatment liquid/Non-white ink composition Recording medium/White ink composition/Treatment liquid+Non-white ink composition Recording medium/White ink composition/Non-white ink composition/Treatment liquid Recording medium/White ink composition/Non-white ink composition+Treatment liquid Recording medium/Non-white ink composition/Treatment liquid/White ink composition Recording medium/Non-white ink composition+Treatment liquid/White ink composition Recording medium/Non-white ink composition/Treatment liquid+White ink composition Recording medium/Non-white ink composition/White ink composition/Treatment liquid Recording medium/Non-white ink composition/White ink composition+Treatment liquid Recording medium/Non-white ink composition/Treatment liquid/White ink composition/Non-white ink composition Recording medium/Non-white ink composition+Treatment liquid/White ink composition/Non-white ink composition Recording medium/Non-white ink composition/Treatment liquid+White ink composition/Non-white ink composition Recording medium/Non-white ink composition/White ink composition/Treatment liquid/Non-white ink composition Recording medium/Non-white ink composition/White ink composition+Treatment liquid/Non-white ink composition When performing the recording method of the line system described later, the composition A is charged into an ink jet head on the upstream side in the transportation direction and the composition B is charged into an ink jet head on the downstream side, and then the compositions A and B are used for recording, whereby a nozzle group for the composition A used for recording can be arranged on the downstream side relative to a nozzle group for the composition B used for recording. Thus, by varying the ink jet head into which each composition is charged, any composition nozzle group used for recording can be arranged on the downstream side relative to any other composition nozzle group used for recording.

For example, the white ink is charged into an ink jet head on the upstream side in the transportation direction and the non-white ink is charged into an ink jet head on the downstream side, and then the inks are used for recording, whereby the non-white ink nozzle group used for recording can be arranged on the downstream side relative to the white ink composition nozzle group used for recording.

The treatment liquid is charged into an ink jet head on the upstream side in the transportation direction and the white ink is charged into an ink jet head on the downstream side, and then the inks are used for recording, whereby the treatment liquid nozzle group used for recording can be arranged on the upstream side relative to the white ink composition nozzle group used for recording.

By varying the ink jet heads into which the white ink composition, the non-white ink composition, and the treatment liquid are charged, the treatment liquid nozzle group used for recording can be arranged on the upstream side relative to the non-white ink composition nozzle group used for recording. Moreover, the treatment liquid nozzle group used for recording can be arranged on the upstream or downstream side relative to the white ink composition nozzle group used for recording.

Number of Times of Main Scanning

The number of times the main scanning is performed is also referred to as the number of passes. In the case of the recording method of the serial system, the number of times of the main scanning in which the nozzle group used for recording of a certain composition passes facing a certain position at which recording is performed of a recording medium is referred to as the number of times of the main scanning of the composition. The number of times of the main scanning is determined for each composition. For example, in the case where the white ink is charged into one nozzle array of the second head in the example of FIG. 4, and then the entire nozzle array is used for recording, the number of times of the main scanning of the white ink is 2 when the distance of one subscanning is ½ of the distance of the length in the subscanning direction of the nozzle array. It is preferable that the number of times of the main scanning is larger in the point that the total adhesion amount of the composition to be caused to adhere can be increased and the composition can be caused to adhere while being divided into several times of the main scanning. On the other hand, a case where the number of times of the main scanning is small is preferable in the point that the recording speed is high. The number of times of the main scanning can be increased by shortening the distance of one subscanning and can be reduced by lengthening the distance.

It is preferable for each adhesion process to include a heating process of heating a recording medium and to cause an ink composition or the like to adhere to the recording surface of the heated recording medium. For the heating of the recording medium, warming mechanisms, such as a platen heater, a warm air heater, and an IR heater, are usable. In the adhesion process, the surface temperature of the recording medium when the ink composition is caused to adhere is preferably 20 to 60° C., more preferably 20 to 50° C., still more preferably 25 to 45° C., yet still more preferably 30 to 40° C., and particularly preferably 32 to 38° C. There is a tendency that the image quality of the obtained recorded content is improved by heating the recording medium to increase the surface temperature. Due to the fact that the surface temperature of the recording medium is 60° C. or less, there is a tendency that the discharge stability and the nozzle clogging recoverability are further improved.

It is preferable for the adhesion process to include an air sending process of sending air to a region to which the ink composition adheres. An air sending method is not particularly limited and a fan or the like provided in a recording apparatus is used, for example. Due to the fact that the air sending process is included, there is a tendency that the ink composition adhering to the recording medium can be efficiently dried and the image quality of the obtained recorded content is further improved. Moreover, it is preferable in the point that the drying of the white ink composition having a high ratio of viscosity increase by drying is further promoted, whereby the sharpness and the like are enhanced.

It is preferable to include a post-heating process of heating a recording medium after the ink adhesion process. A heating method is not particularly limited and a platen heater, a warm air heater, an IR heater, and the like are mentioned, for example. The heating temperature can be preferably set to 60° C. or more. The heating temperature is more preferably 70 to 120° C. preferably and more preferably 80 to 110° C.

Second Recording Method

A second recording method of this embodiment is a recording method which uses a white ink composition containing a white coloring material and a resin, a non-white ink composition containing a non-white coloring material and a resin, and a treatment liquid containing a coagulant for coagulating the component of the non-white ink composition, in which, when the treatment liquid and the ink composition are mixed, a ratio of the viscosity increase after the mixing to the viscosity increase before the mixing is lower in the white ink composition than in the non-white ink composition, and which includes a treatment liquid adhesion process of causing the treatment liquid to adhere to a recording medium, a non-white ink adhesion process of causing the non-white ink composition to adhere to the recording medium, and a white ink adhesion process of causing the white ink composition to adhere to the recording medium.

According to such a recording method, the recording method can be further improved in sharpness. As the treatment liquid, the treatment liquid described above is usable. A recording method may be acceptable which uses the treatment liquid described above and in which, when the treatment liquid and the ink composition are mixed, the ratio of the viscosity increase after the mixing to the viscosity increase before the mixing is lower in the white ink composition than in the non-white ink composition. The ratio of the viscosity increase after the mixing to the viscosity increase before the mixing in mixing the treatment liquid and the ink composition is one obtained by, in a method for measuring the ratio of viscosity increase by coagulant using a test liquid which is the 5% by mass calcium acetate monohydrate aqueous solution described above, replacing the test liquid with the treatment liquid used for the recording method, and then similarly measuring the ratio of viscosity increase. For the white ink composition and the non-white ink composition, the white ink composition and the non-white ink composition described above are usable except this point. The components which may be contained in the white ink composition and the non-white ink composition described above may be contained and the content thereof and the properties of the compositions can be made the same as those of the white ink composition and the non-white ink composition described above.

According to such a recording method, the consumption of the coagulant by the white ink can be suppressed, the coagulation of the non-white ink can sufficiently progress, and excellent sharpness is obtained.

The second recording method can be made the same as the first recording method in points other than the points described above.

Recording Medium

Examples of the recording medium include an absorptive recording medium, a low-absorptive recording medium, or a non-absorptive recording medium, for example. Among the above, the low-absorptive recording medium or the non-absorptive recording medium is preferable. By the use of such a recording medium, the image quality of the obtained recorded content is further improved, and thus the embodiments of the invention are particularly useful.

Examples of the absorptive recording medium include, but are not particularly limited to, a plain paper, such as an electrophotographic paper having high permeability of an ink composition, an inkjet printing paper (inkjet paper for exclusive use for ink jet provided with an ink absorption layer containing silica particles or alumina particles or an ink absorption layer containing a hydrophilic polymer, such as polyvinyl alcohol (PVA) or polyvinyl pyrrolidone (PVP)), and the like, for example.

Examples of the low-absorptive recording medium include, but are not particularly limited to, a coated paper provided with a coating layer for receiving an ink on the surface, for example. Examples of the coated paper include, but are not particularly limited to, printing papers, such as an art paper, a coated paper, and a matte paper, wallpaper, and the like, for example.

Examples of the non-absorptive recording medium include, but are not particularly limited to, recording media in which films of plastics, such as polyvinyl chloride, polyethylene, polypropylene, polyethylene terephthalate (PET), polycarbonate, polystyrene, and polyurethane are bonded (coating) to base materials, such as films and plates of plastics, such as polyvinyl chloride, polyethylene, polypropylene, polyethylene terephthalate (PET), polycarbonate, polystyrene, and polyurethane; plates of metals, such as iron, silver, copper, and aluminum; metal plates manufactured by vapor deposition of the various metals, plastic films, plates of alloys, such as stainless steel and brass; and paper, cloth, and film, for example.

Herein, the "low-absorptive recording medium" or the "non-absorptive recording medium" refers to a recording medium in which the water absorption amount from the initiation of contact to 30 msec is 10 mL/m$^2$ or less in the Bristow method. The Bristow method is the most spread method as a method for measuring the liquid absorption amount in a short period of time and is used also in the Japan Technical Association of the Pulp and Paper Industry (JAPAN TAPPI). The details of a test method are described in "Liquid Absorbency Test Method of Paper and Paperboard (Bristow Method)" of Standard No. 51 of "JAPAN TAPPI paper pulp test method, 2000". The low-absorptive recording medium refers to a recording medium in which the water absorption amount is 5 mL/m$^2$ or more and 10 mL/m$^2$ or less. On the other hand, the absorptive recording medium refers to a recording medium in which the water absorption amount exceeds 10 mL/m$^2$.

The non-absorptive recording medium or the low-absorptive recording medium can be classified according to the wettability to water of a recording surface. For example, 0.5 μL water droplets are added dropwise on the recording surface of a recording medium, and then a contact angle decrease rate (comparison between the contact angle after the lapse of 0.5 ms after landing with the contact angle after the lapse of 5 seconds after landing) is measured, whereby the recording medium can be characterized. More specifically, the non-absorptive of the "non-absorptive recording medium" refers to the fact that the decrease rate is less than 1% and the low absorptivity of the "low-absorptive recording medium" refers to the fact that the decrease rate is 1% or more and less than 5%. The absorptivity refers to the fact that the decrease rate is 5% or more. The contact angle can be measured with a portable contact angle meter PCA-1 (manufactured by Kyowa Interface Science), for example.

Recording Apparatus

A recording apparatus used in this embodiment is not particularly limited insofar as recording is performed by the recording method described above and an ink jet head having nozzles discharging a white ink composition and a non-white ink composition to a recording medium and a mechanism of causing a treatment liquid to adhere are provided. FIG. 2 illustrates a schematic cross sectional view of the recording apparatus. As illustrated in FIG. 2, a recording apparatus 1 is provided with a recording head 2, an IR heater 3, a platen heater 4, a drying heater 5, a cooling fan 6, a preheater 7, and a fan 8.

The recording head 2 discharges a white ink composition and a non-white ink composition to a recording medium. As the recording head 2, a known system is usable and one discharging liquid droplets utilizing vibration of a piezoelectric element, i.e., a head forming ink droplets by mechanical deformation of an electrostrictive element, is mentioned. Although the IR heater 3 and the platen heater 4 mainly heat a recording medium 10, the recording head 2 may also be heated. By the IR heater 3, the recording medium 10 can be heated from the recording head 2 side. Thus, when the platen heater 4 is used, the recording medium 10 can also be heated from the side opposite to the recording head 2. The drying heater 5 dries the recording medium 10 to which the white ink composition and the non-white ink composition adhere. By heating the recording medium 10 on which an image is recorded, the moisture and the like contained in the ink composition more promptly evaporates and scatters, and then a coating film is formed by the resin contained in the ink composition. Thus, ink dried matter can be firmly fixed (bonded) on the recording medium 10, and thus a high-definition image excellent in abrasion resistance can be obtained in a short period of time. During the recording, the recording medium 10 is transported from the right to the left in the figure.

The recording apparatus 1 may have the cooling fan 6. By cooling the white ink composition and the non-white ink composition on the recording medium 10 by the cooling fan 6 after drying, there is a tendency that a coating film can be formed with sufficient adhesiveness on the recording medium 10.

Moreover, the recording apparatus 1 may be provided with the preheater 7 heating the recording medium beforehand (preheating) before the white ink composition and the non-white ink composition are discharged to the recording medium 10. Due to the fact that the recording medium 10 is preheated before the ink compositions are discharged, there is a tendency that a high-definition image with little blurring can be formed on the recording medium 10, particularly a non-absorptive or a low-absorptive recording medium.

The recording head 2 is mounted on a carriage 9. The carriage 9 performs scanning (main scanning) of discharging the ink composition while moving in a direction from the front side to the deep side in the figure to cause the ink composition to adhere to the recording medium which the head 2 faces. Recording is performed by alternately performing the scanning and transportation (subscanning) of the recording medium 10. More specifically, a serial system recording method in which recording is performed by performing the scanning several times is performed.

Figure 6:
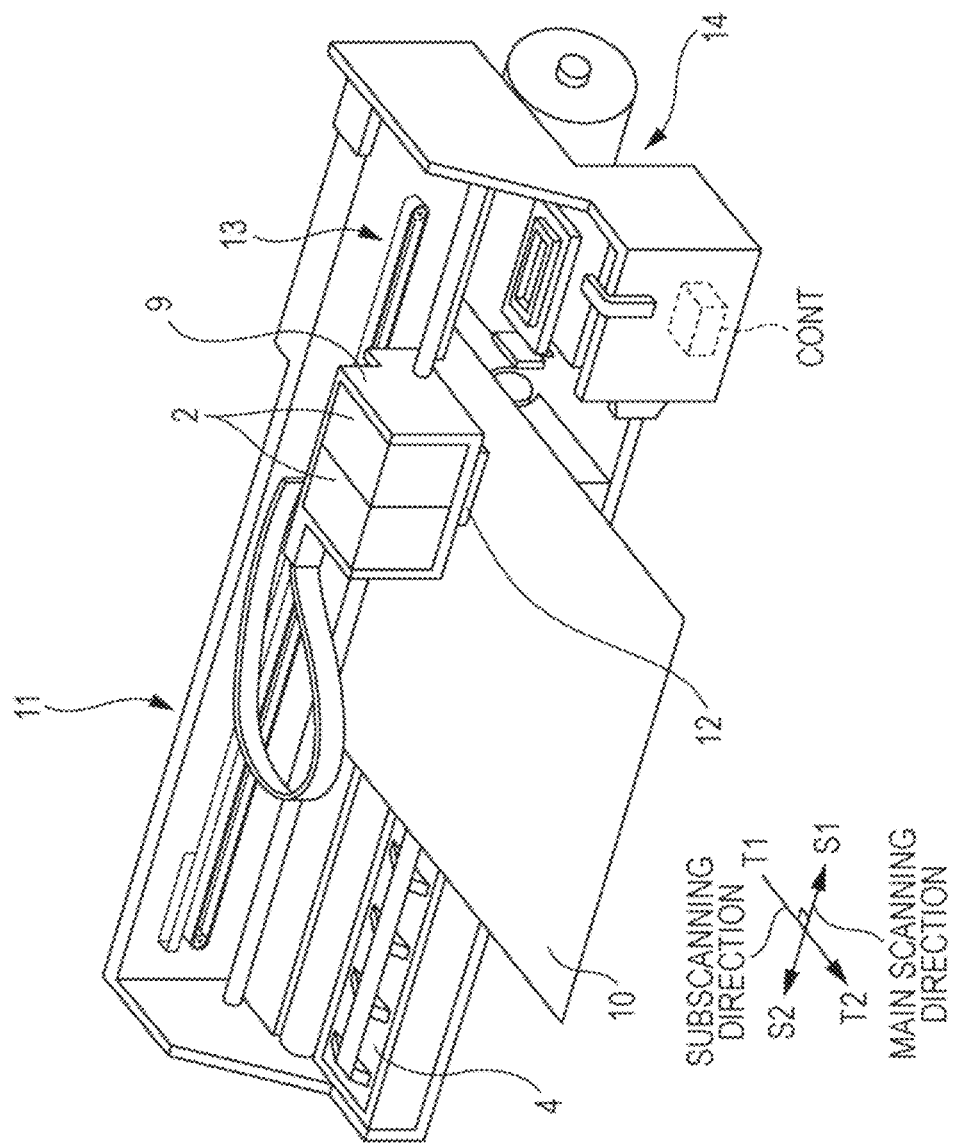
FIG. 6 is a schematic perspective view illustrating the configuration of the periphery of a carriage of the recording apparatus used in this embodiment.

FIG. 6 is a perspective view illustrating an example of the configuration of the periphery of the carriage 9 of the recording apparatus 1 of FIG. 2. A configuration 11 of the periphery of the carriage 9 has the carriage 9, the ink jet head 2 mounted on the carriage 9, a member 12 which is a part of the ink jet head 2 and contains a nozzle discharging an ink, an ink container (not illustrated), and an ink supply path (not illustrated), such as an ink supply tube, supplying an ink to the ink jet head 2 from the ink container. The ink container may be provided at a place other than the carriage 9 or may be provided in the carriage 9. Moreover, a platen 4 which is disposed under the carriage 9 and to which the recording medium 10 is transported, a carriage moving mechanism 13 moving the carriage 9 relatively to the recording medium 10, a transportation unit 14 which is a roller transporting the recording medium 10 in the subscanning direction (transportation direction), and a control portion CONT controlling operations of the carriage 9 and the like are provided. A S1-S2 direction is the main scanning direction and a T1→T2 direction is the subscanning direction. The main scanning is performed in one direction of the main scanning directions (right and left directions of the apparatus) by one main scanning.

Figure 3A:
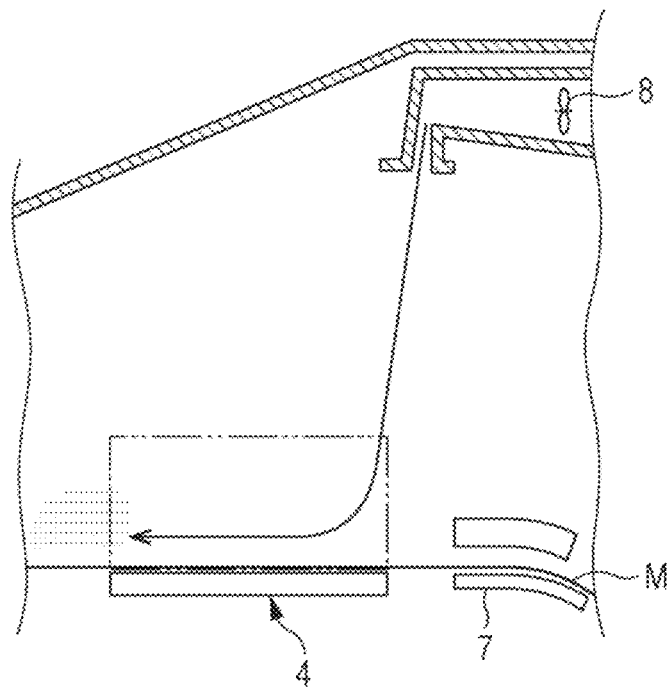
FIG. 3A is a partial side view of the recording apparatus in an ink adhesion process and illustrates an aspect in which a carriage is not disposed.
Figure 3B:
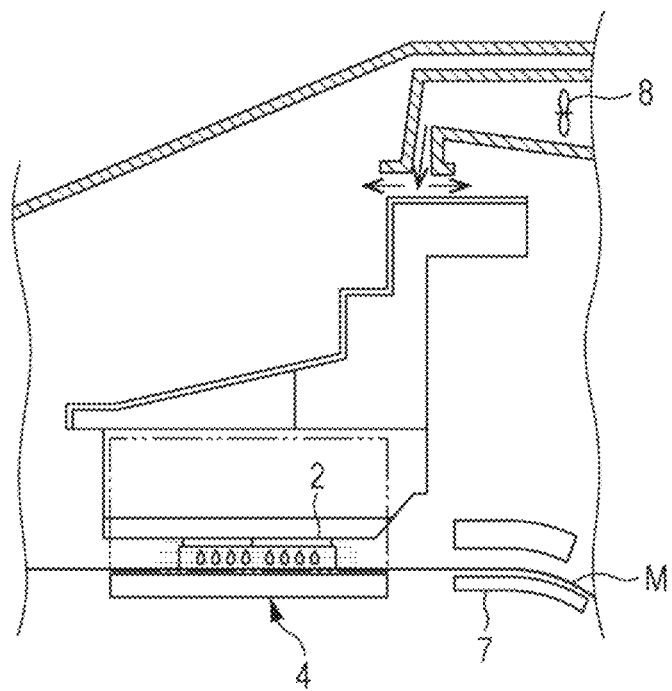
FIG. 3B is a partial side view of the recording apparatus in an ink adhesion process and illustrates an aspect in which a carriage is disposed.

Furthermore, the recording apparatus 1 of FIG. 2 is provided with the fan 8 for sending air to the surface of the recording medium 10 from the viewpoint of efficient drying of the ink composition or the viewpoint of adjustment of the temperatures of the recording medium 10 and the nozzle surface. To describe the fan 8 in more detail, a description is given with reference to FIGS. 3A and 3B. Also in FIGS. 3A and 3B, the recording head 2 is mounted on the carriage 9 and discharges the ink composition from the head 2 while moving in the main scanning direction which is the direction from the front side to the deep side of the figure to perform the main scanning. In FIGS. 3A and 3B, FIG. 3A illustrates a state where air in a place where the carriage 9 is not present in the main scanning direction (direction from the front side to the deep side in the figure) flows to the recording medium 10 and FIG. 3B illustrates a state where air in a place where the carriage 9 is present does not directly flow to the recording medium 10 in the main scanning direction of the carriage 9.

Two or more fans 8 are provided along the width direction (main scanning direction) of the recording medium 10 and are provided so as to be able to always send air in a belt like shape from one end to the other end in the width of the recording medium 10. In FIG. 3A, the air hits the surface of the recording medium 10. The air hits the surface of the recording medium 10 so as to be inclined in the left direction of the figure. Therefore, after hitting, the direction of the air changes to the left direction of the figure, so that the air is sent to the downstream side in the recording medium transportation direction in parallel to the surface of the recording medium 10 in a region, to which an ink adheres, of the recording medium 10. Thus, the drying of the ink in the region to which the ink adheres of the recording medium 10 can be promoted.

On the other hand, in FIG. 3B, the air hits a windshield member provided in an upper portion of the carriage 9, and then is split into two in the right and left directions of the figure to change the direction, and thus the air does not directly hit the surface of the recording medium 10. Thus, the influence of clogging or positional shift of landing caused by the influence of the air on a nozzle and ink droplets during flying can be reduced in a place where the carriage 9 is present.

However, in FIG. 3A, the direction of the air to be sent in parallel to the surface of the recording medium 10 slightly may fluctuate, and thus the air may be sent into the recording head 2 from the lateral direction also in the place where the carriage 9 is present, and therefore the landing position may be affected. Moreover, in FIG. 3B, the air that has hit the windshield member changes the direction in which the air flows to an unintended direction in some cases, and thus the similar influence may slightly occur.

The fan 8 of FIGS. 3A and 3B illustrate one aspect of an air sending unit of sending air onto the recording medium 10. The air sending unit is not limited insofar as air can be sent to the recording medium 10. As another aspect, a sending port may be placed sideways to send air to an upper layer of the recording medium 10 or air may be sent from above to an ink adhesion region of the surface of the recording medium 10.

Figure 7:
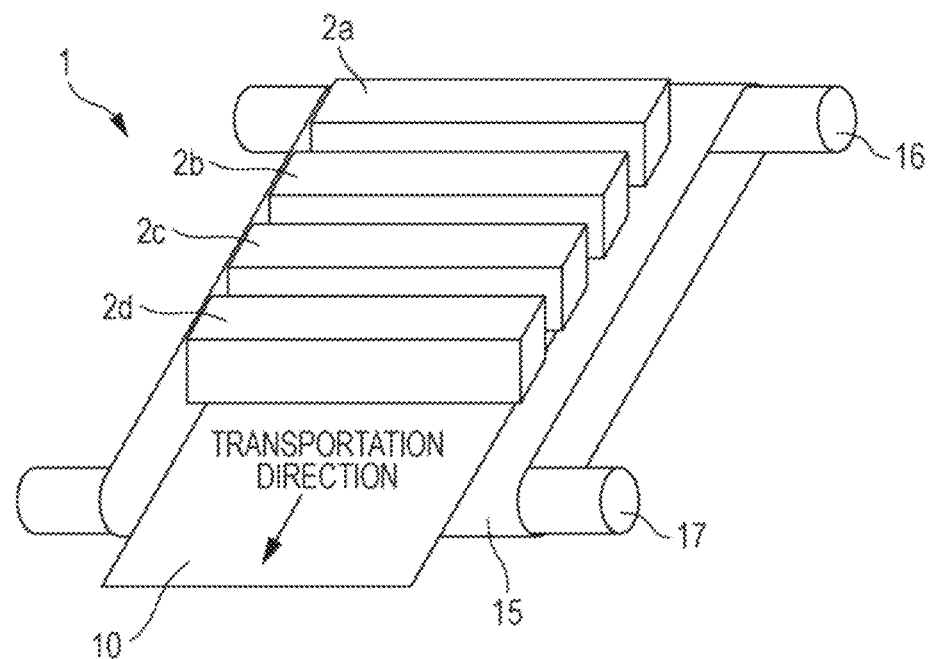
FIG. 7 is a schematic perspective view illustrating another configuration example of the recording apparatus to be use in this embodiment.

FIG. 7 is a schematic view illustrating another example of the recording apparatus usable in this embodiment. In the recording apparatus 1, ink jet heads (2a to 2d) which are line heads are disposed in a direction crossing the scanning direction which is the transportation direction of the recording medium 10. A belt 15 supporting the recording medium 10 and transportation units (16, 17) transporting the recording medium 10 are provided. The line head is an ink jet head having a length equal to or larger than the recording width of the recording medium 10 in a direction crossing the transportation direction of the recording medium 10. Recording is performed by scanning of discharging ink droplets from a nozzle opening of the line head, and then causing the ink droplets to adhere to the recording medium 10 while transporting the recording medium in the transportation direction. By such scanning, the adhesion process of the treatment liquid and the adhesion process of each ink composition are performed. Thus, recording is performed by the recording method of the line system. It is the recording apparatus of the line system. One composition, such as an ink, is discharged from one ink jet head. The composition, such as an ink, is caused to adhere to the recording medium 10 in order from the ink jet head provided on the upstream side in the transportation direction of the recording medium 10 to the ink jet head provided on the downstream side. The number of the ink jet heads is not limited to 4 and may be provided according to the number of compositions, such as an ink, used for recording. As configurations other than the configurations illustrated in FIG. 7 of the recording apparatus 1 of the line system, the same configurations as the configurations other than the ink jet head 2 and the carriage 9 of the recording apparatus of FIG. 2 may be used. The recording method of the line system is preferable in the point that the recording speed is high.

EXAMPLES

Hereinafter, aspects of the invention are more specifically described with reference to Examples and Comparative Examples. The invention is not particularly limited by Examples described below.

Materials for Ink Composition

Main materials of ink compositions and treatment liquids used in Examples and Comparative Examples described below are as follows.

Pigment Dispersion Liquid

Production examples 1 to 3 described below are to be referred to.

Organic Solvent

Dipropylene glycol dimethyl ether

Propylene glycol 2-pyrrolidone

Coagulant

Calcium acetate monohydrate

Calcium chloride dihydrate

Acetic acid

Catiomaster PD-7 (manufactured by Yokkaichi Chemical Company, Limited., Cationic resin: Amine epichlorohydrin condensation polymer)

Resin

Resin emulsion 1 (refer to Production Example 4 described below)

Resin emulsion 2 (refer to Production Example 5 described below) Wax

AQUACER515 (manufactured by BYK Chemie Japan, wax emulsion)

Surfactant

Dynol 607 (manufactured by Air Products, Japan, Inc., Acetylene diol-based surfactant)

BYK348 (manufactured by BYK Chemie Japan, Silicone-based surfactant)

Antifoaming Agent

Surfynol DF110D (manufactured by Nisshin Chemical Co., Ltd., Acetylene diol type)

Production Example 1: Preparation of Cyan Pigment Dispersion Liquid 40 parts by mass of an St-Ac acid copolymer (obtained by copolymerizing Methacrylic acid/Butyl acrylate/Styrene/Hydroxyethyl acrylate at a mass ratio of 25/50/15/10, Weight average molecular weight of 7000, Acid value of 150 mgKOH/g) was charged into a liquid obtained by mixing 7 parts by mass of potassium hydroxide, 23 parts by mass of water, and 30 parts by mass triethylene glycol mono-n-butyl ether, and then the mixture was heated at 80° C. under stirring to prepare a resin aqueous solution.

20 parts by mass of a pigment, 10 parts by mass of a resin aqueous solution, 10 parts by mass of diethylene glycol, and 60 parts by mass of ion exchanged water were mixed, and then dispersed using a zirconia bead mill to obtain a pigment dispersion liquid of each color. The used pigments are as follows.

Black pigment dispersion liquid; Carbon black
Cyan pigment dispersion liquid; C.I. PB15:3

Production Example 2: Preparation of Black Pigment Dispersion Liquid 15 parts by mass of carbon black, 1.5 parts by mass of Solsperse 2700 (manufactured by Lubrizol Corporation), 1.8 parts by mass of triethanol amine, 0.1 part by mass of an antifoaming agent ("Surfynol 104E" manufactured by Air Products Inc.), and 81.6 parts by mass of ion exchanged water were mixed, and then dispersed using zirconia beads to obtain a black pigment dispersion.

Production Example 3: Preparation of White Pigment Dispersion Liquid 25 g of titanium oxide (Trade Name: CR-58, manufactured by Ishihara Sangyo Kaisha, Ltd.), 8.5 g of a dispersant (Trade Name: Disperon AQ-380, manufactured by Kusumoto Chemicals, Ltd.), and 66.5 g of water were mixed, and then dispersed for 5 minutes using zirconia beads 0.3 mm in diameter at a filling factor of 60% by volume and at 8 m/s to obtain a white pigment dispersion liquid having a solid content concentration of 25% by mass.

Production Example 4: Preparation of Resin Emulsion 1

75 parts by mass of styrene, 0.8 part by mass of acrylic acid, 14.2 parts by mass of methylmethacrylate, and 10 parts by mass of cyclohexyl methacrylate were emulsified and copolymerized to thereby obtain a resin emulsion 1 (Acid value of 7 mgKOH/g). As a surfactant for emulsion polymerization, Newcol NT-30 (manufactured by NIPPON NYU-KAZAI CO., LTD.) was used. The use amount was 2 parts by mass when the total monomer amount was set to 100 parts by mass.

Production Example 5: Preparation of Resin Emulsion 2

A resin emulsion 2 (Acid value of 30 mgKOH/g) was obtained in the same manner as above, except changing the monomer composition.

Preparation of Ink Composition and Treatment Liquid

Materials were mixed at the compositions included in the following tables 1 and 2, and then sufficiently stirred to obtain ink compositions and treatment liquids. The unit of the numerical values is % by mass in the following tables 1 and 2 and the total is 100.0% by mass. The % by mass of the pigment and the resin are % by mass in an ink of the solid contents of the pigment and the resin, respectively.

Viscosity Increase by Coagulant

The ink composition was mixed at a mass ratio that the content of the ink composition was 10 g to 1 g of a 5% by mass calcium acetate monohydrate aqueous solution, and then stirred for 10 seconds. The viscosity after the lapse of 10 seconds was promptly measured. All the tests were performed at normal temperature, an E type viscometer (MCR302, manufactured by Anton Paar Japan K.K.) was used as a viscometer, and the shear rate was set to 200 s−1. The viscosity increase by coagulant was calculated by the expression described above.

The initial viscosities before mixing of inks 1 to 5 were all about 2 to 5 mPa·s.

Viscosity Increase by Drying 50 g of the ink composition was poured into a 100 ml sample bottle, a volatilization component was removed while being stirred in a 40° C. open system, and then the viscosity when the mass of the ink composition decreased by 50% by mass (volatilization) was measured. Moreover, the viscosity of the ink composition before drying was also measured. The viscosity measurement was performed at normal temperature, an E type viscometer (MCR302, manufactured by Anton Paar Japan K.K.) was used as a viscometer, and the shear rate was set to 200 s−1. The viscosity increase by drying was calculated by the expression described above.

TABLE 1

| | | Treatment liquid 1 | Treatment liquid 2 | Treatment liquid 3 | Treatment liquid 4 |
|---|---|---|---|---|---|
| Solvent | Dipropylene glycol dimethyl ether | 15 | 15 | 15 | 15 |
| | 2-pyrrolidone | 10 | 10 | 10 | 10 |
| Coagulant | Calcium acetate monohydrate | 5 | | | |
| | Calcium chloride dihydrate | | | | 4 |
| | Acetic acid | | 3 | | |
| | Catiomaster PD (Solid content) | | | 4 | |
| Antifoaming agent | DF110D | 0.1 | 0.1 | 0.1 | 0.1 |
| Surfactant | Dynol 607 | 1 | 1 | 1 | 1 |
| | Pure water | Balance | Balance | Balance | Balance |
| | Total | 100 | 100 | 100 | 100 |

TABLE 2

| Ink type | | Non-white ink | | White ink | | |
|---|---|---|---|---|---|---|
| Ink name | | Ink 1 | Ink 2 | Ink 3 | Ink 4 | Ink 5 |
| Solvent | Propylene glycol | 5 | 5 | 5 | 5 | 5 |
| | Dipropylene glycol dimethyl ether | 7 | 7 | 2 | 7 | 2 |
| | 2-pyrrolidone | 13 | 13 | 13 | | 13 |
| Pigment | Black dispersion liquid | 2 | | | | |
| | Cyan dispersion liquid | | 2 | | | |
| | White dispersion liquid | | | 10 | 10 | 10 |
| Resin | Resin emulsion 1 | 5 | 5 | 5 | 4 | |
| | Resin emulsion 2 | | | | | 5 |
| | Wax emulsion | 2 | 2 | 2 | 1 | 2 |
| Antifoaming agent | DF110D | 0.1 | 0.1 | 0.1 | 0.1 | 0.1 |
| Surfactant | BYK348 | 1 | 1 | 1 | 1 | 1 |
| | Pure water | Balance | Balance | Balance | Balance | Balance |
| | Total | 100 | 100 | 100 | 100 | 100 |
| | Ratio of viscosity increase by coagulant (Ca acetate) | 5.21 | 6.75 | 1.20 | 1.20 | 7.95 |
| | Ratio of viscosity increase by drying | 19.92 | 18.67 | 40.79 | 19.55 | 38.66 |

Recording Method

A converted machine of SC-S80650 (manufactured by Seiko Epson Corp.) having a platen heater (hereinafter referred to as "SC-S80650 converted machine") was prepared. Recording of an ink and the like was enabled using the serial type ink jet head as illustrated in FIG. 5. In Forms 1 to 5, the treatment liquid, the white ink, and the non-white ink were charged in this order into one nozzle group at the left end of each head of the first, second, and third heads. In Forms 6 and 7, the treatment liquid, the non-white ink, and the white ink were charged in this order into the first, second, and third heads (similarly one nozzle group). In each of the following forms, the nozzle group used for recording was set, and then recording was performed. The symbol "+" means that the white ink composition, the non-white ink composition, and the treatment liquid were caused to adhere in the same main scanning using the nozzle groups of the overlapped portion. The symbol "→" means that the white ink composition, the non-white ink composition, and the treatment liquid were caused to adhere in this order.

Figure 8:
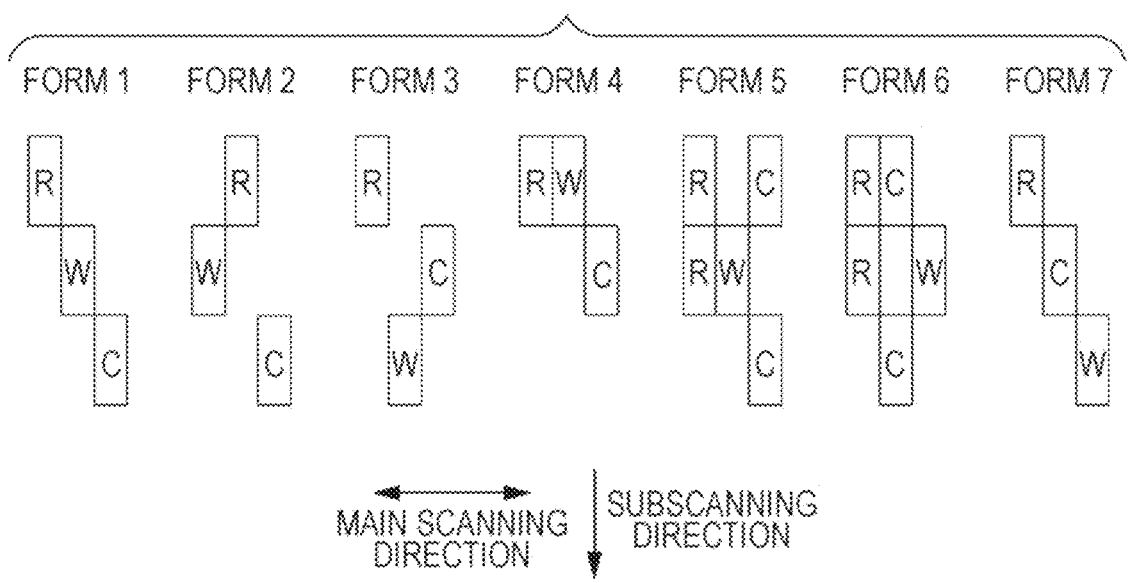
FIG. 8 is a schematic view illustrating examples of nozzle groups used in a recording method of this embodiment.

FIG. 8 illustrates that the positional relationship of only the nozzle groups used for recording in each form is illustrated in an image. In the figure, R indicates that a treatment liquid nozzle group used for recording, W indicates a white ink nozzle group used for recording, and C indicates a non-white ink nozzle group used for recording.

Form
1: Treatment liquid→White ink→Non-white ink
2: White ink→Treatment liquid→Non-white ink
3: Treatment liquid→Non-white ink→White ink
4: (Treatment liquid+White ink)→Non-white ink
5: (Treatment liquid+Non-white ink)→(Treatment liquid+White ink)→Non-white ink
6: (Treatment liquid+Non-white ink)→(Treatment liquid+White ink)→Non-white ink
7: Treatment liquid→Non-white ink→White ink In Form 1, liquid droplets of the treatment liquid charged into a nozzle group on the most upstream side of the three-divided nozzle groups in the subscanning direction of the first head first adheres onto a recording medium, liquid droplets of the white ink charged into a nozzle group at the center of the three-divided nozzle groups of the second head then adheres thereonto, and finally liquid droplets of the non-white ink charged into a nozzle group on the most downstream side of the three-divided nozzle groups of the third head adheres.

In Form 2, liquid droplets of the white ink charged into a nozzle group on the most upstream side of the three-divided nozzle groups in the subscanning direction of the second head first adheres onto a recording medium, liquid droplets of the white ink charged into a nozzle group at the center of the three-divided nozzle groups of the first head then adheres thereonto, and finally liquid droplets of the non-white ink charged into a nozzle group on the most downstream side of the three-divided nozzle groups of the third head adheres.

In Form 3, liquid droplets of the treatment liquid charged into a nozzle group on the most upstream side of the three-divided nozzle groups in the subscanning direction of the first head first adheres onto a recording medium, liquid droplets of the non-white ink charged into a nozzle group at the center of the three-divided nozzle groups of the third head then adheres thereonto, and finally liquid droplets of the white ink charged into a nozzle group on the most downstream side of the three-divided nozzle groups of the second head adheres.

In Form 4, liquid droplets of the treatment liquid charged into a nozzle group on the most upstream side of the three-divided nozzle groups of the first head and liquid droplets of the white ink charged into a nozzle group on the most upstream side of the three-divided nozzle groups of the second head simultaneously adhere onto a recording medium, and then liquid droplets of the non-white ink charged into a nozzle group at the center of the three-divided nozzle groups of the third head adheres.

In Form 5, liquid droplets of the treatment liquid and liquid droplets of the non-white ink simultaneously adhere onto a recording medium using a nozzle group on the most upstream side of the three-divided nozzle groups of the first head and a nozzle group on the most upstream side of the three-divided nozzle groups of the third head, liquid droplets of the treatment liquid and liquid droplets of the white ink then simultaneously adhere onto the recording medium using a nozzle group at the center of the three-divided nozzle groups of the first head and a nozzle group at the center of the three-divided nozzle groups of the second head, and finally liquid droplets of the non-white ink adheres onto the recording medium using a nozzle group on the most downstream side of the three-divided nozzle groups of the third head.

In Form 6, liquid droplets of the treatment liquid and liquid droplets of the non-white ink simultaneously adhere onto a recording medium using a nozzle group on the most upstream side of the three-divided nozzle groups of the first head and a nozzle group on the most upstream side of the three-divided nozzle groups of the second head, liquid droplets of the treatment liquid and liquid droplets of the white ink then simultaneously adhere onto the recording medium using a nozzle group at the center of the three-divided nozzle groups of the first head and a nozzle group at the center of the three-divided nozzle groups of the third head, and finally liquid droplets of the non-white ink adheres onto the recording medium using a nozzle group on the most downstream side of the three-divided nozzle groups of the second head.

In Form 7, liquid droplets of the treatment liquid charged into a nozzle group on the most upstream side of the three-divided nozzle groups in the subscanning direction of the first head first adheres onto a recording medium, liquid droplets of the non-white ink charged into a nozzle group at the center of the three-divided nozzle groups of the second head then adheres thereonto, and finally liquid droplets of the white ink charged into a nozzle group on the most downstream side of the three-divided nozzle groups of the third head adheres.

Each non-used nozzle group is defined as a nozzle group not used for recording.

The treatment liquid and the ink composition are discharged from the ink jet heads by an ink jet method to be caused to adhere to a recording medium (Solvoprint performance clear80 (manufactured by Neschen)). The adhesion amount of the treatment liquid was as in Tables 3 to 5. The adhesion amount is an adhesion amount of the treatment liquid to the total adhesion amount of each ink. The adhesion amounts of adhesion regions of the white ink composition and the non-white ink composition were 10 mg/inch$^2$. The basic resolution was set to 720×720 dpi and the dot density was adjusted so that the adhesion amount was the value described above in each composition.

The number of times of the main scanning was set to 5 passes in each layer. More specifically, it was configured so that the distance of one subscanning was set to ⅛ of the length in the subscanning direction of the nozzle group of one composition used for recording and the nozzle group used for recording of one composition faces a certain point in the subscanning direction of a region in which recording was to be performed by eight times of main scanning.

Finally, recorded content was heated at 95° C. for 150 seconds by a secondary heater located on the downstream side relative to the ink jet head to be dried.

In the recording method described above, the platen heater was controlled so that the surface temperature of the recording medium in a platen region facing the head during recording was the heating temperature in Tables 3 to 5. Specifically, when the surface temperature was set to 32° C. or more, the platen heater was turned ON to adjust the temperature and, when the surface temperature was set to 25° C. or less, the room temperature was adjusted without using the platen heater, so that the surface temperature of the recording medium in recording was adjusted.

TABLE 3

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Treatment liquid | Treatment liquid 1 | Treatment liquid 1 | Treatment liquid 2 | Treatment liquid 3 | Treatment liquid 4 | Treatment liquid 1 | Treatment liquid 1 | Treatment liquid 1 | Treatment liquid 1 | Treatment liquid 1 | Treatment liquid 1 | Treatment liquid 1 |
| White ink | Ink 3 | Ink 3 | Ink 3 | Ink 3 | Ink 3 | Ink 3 | Ink 3 | Ink 3 | Ink 3 | Ink 3 | Ink 3 | Ink 3 |
| Non-white ink | Ink 1 | Ink 2 | Ink 1 | Ink 1 | Ink 1 | Ink 1 | Ink 1 | Ink 1 | Ink 1 | Ink 1 | Ink 1 | Ink 1 |
| Form | Form 1 | Form 1 | Form 1 | Form 1 | Form 1 | Form 2 | Form 3 | Form 4 | Form 5 | Form 1 | Form 1 | Form 1 |
| Adhesion temperature (° C.) | 32 | 32 | 32 | 32 | 32 | 32 | 32 | 32 | 32 | 40 | 25 | 32 |
| Treatment liquid adhesion amount (based on % by mass of ink) | 10 | 10 | 10 | 10 | 10 | 10 | 10 | 10 | 10 | 10 | 10 | 5 |
| Comparison of ratio of viscosity increase by coagulant | Non-white >White | Non-white >White | Non-white >White | Non-white >White | Non-white >White | Non-white >White | Non-white >White | Non-white >White | Non-white >White | Non-white >White | Non-white >White | Non-white >White |
| Comparison of ratio of viscosity increase by drying | Non-white <White | Non-white <White | Non-white <White | Non-white <White | Non-white <White | Non-white <White | Non-white <White | Non-white <White | Non-white <White | Non-white <White | Non-white >White | Non-white <White |
| Evaluation | | | | | | | | | | | | |
| Sharpness evaluation | B | B | B | C | B | A | A | A | A | A | C | C |
| Color mixing evaluation | B | B | B | B | B | B | B | A | — | A | C | C |
| Abrasion resistance | B | B | C | A | B | B | C | B | B | A | B | A |
| Discharge stability (white) | A | A | B | C | A | A | A | B | B | C | A | A |
| Discharge stability (non-white) | A | A | A | A | A | B | B | A | C | A | A | A |

TABLE 4

| | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|
| Pretreatment liquid | Treatment liquid 1 | Treatment liquid 1 | Treatment liquid 1 | Treatment liquid 1 | Treatment liquid 1 | Treatment liquid 1 | Treatment liquid 1 | Treatment liquid 1 | Treatment liquid 1 | Treatment liquid 1 | Treatment liquid 3 | Treatment liquid 1 |
| White ink | Ink 3 | Ink 4 | Ink 4 | Ink 4 | Ink 4 | Ink 4 | Ink 4 | Ink 3 | Ink 4 | Ink 3 | Ink 3 | Ink 3 |
| Color ink | Ink 1 | Ink 1 | Ink 1 | Ink 1 | Ink 1 | Ink 1 | Ink 1 | Ink 1 | Ink 1 | Ink 1 | Ink 1 | Ink 1 |

TABLE 4-continued

|  | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|
| Form | Form 1 | Form 1 | Form 2 | Form 3 | Form 4 | Form 5 | Form 1 | Form 6 | Form 6 | Form 7 | Form 1 | Form 1 |
| Adhesion temperature (° C.) | 32 | 32 | 32 | 32 | 32 | 32 | 40 | 32 | 32 | 32 | 40 | 38 |
| Treatment liquid adhesion amount (based on % by mass of ink) | 20 | 10 | 10 | 10 | 10 | 10 | 10 | 10 | 10 | 10 | 10 | 10 |
| Comparison of ratio of viscosity increase by coagulant | Non-white >White | Non-white >White | Non-white >White | Non-white >White | Non-white >White | Non-white >White | Non-white >White | Non-white >White | Non-white >White | Non-white >White | Non-white >White | Non-white >White |
| Comparison of ratio of viscosity increase by drying | Non-white <White | Non-white >White | Non-white >White | Non-white >White | Non-white >White | Non-white >White | Non-white >White | Non-white <White | Non-white >White | Non-white <White | Non-white <White | Non-white <White |
| Evaluation |  |  |  |  |  |  |  |  |  |  |  |  |
| Sharpness evaluation | A | C | C | C | C | C | B | A | C | A | B | A |
| Color mixing evaluation | B | C | C | C | C | — | B | — | — | B | B | B |
| Abrasion resistance | C | B | B | C | B | B | A | B | B | C | A | A |
| Discharge stability (white) | A | B | B | B | B | B | B | B | B | A | C | B |
| Discharge stability (non-white) | B | A | B | B | A | C | B | D | D | C | A | A |

TABLE 5

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Pretreatment liquid | Treatment liquid 1 | Treatment liquid 1 | Treatment liquid 1 | Treatment liquid 1 | Treatment liquid 1 | — | Treatment liquid 1 | Treatment liquid 1 |
| White ink | Ink 5 | Ink 5 | Ink 5 | Ink 5 | Ink 5 | Ink 3 | Ink 5 | Ink 5 |
| Color ink | Ink 1 | Ink 1 | Ink 1 | Ink 1 | Ink 1 | Ink 1 | Ink 1 | Ink 1 |
| Form | Form 1 | Form 2 | Form 3 | Form 4 | Form 5 | Form 1 | Form 6 | Form 7 |
| Adhesion temperature (° C.) | 32 | 32 | 32 | 32 | 32 | 32 | 32 | 32 |
| Treatment liquid adhesion amount (based on % by mass of ink) | 10 | 10 | 10 | 10 | 10 | 10 | 10 | 10 |
| Comparison of ratio of viscosity increase by coagulant | Non-white <White | Non-white <White | Non-white <White | Non-white <White | Non-white <White | Non-white >White | Non-white <White | Non-white <White |
| Comparison of ratio of viscosity increase by drying | Non-white <White | Non-white <White | Non-white <White | Non-white <White | Non-white <White | Non-white <White | Non-white <White | Non-white <White |
| Evaluation |  |  |  |  |  |  |  |  |
| Sharpness evaluation | D | D | D | D | D | D | D | D |
| Color mixing evaluation | C | C | D | C | — | D | — | D |
| Abrasion resistance | C | B | C | C | B | A | B | C |
| Discharge stability (white) | C | C | A | D | D | A | C | A |
| Discharge stability (non-white) | A | B | B | A | C | A | D | C |

Sharpness Evaluation

On a region of a solid pattern to which the white ink composition was caused to adhere by the recording method described above, "驚" was printed at 4 pt using the non-white ink composition. In the case of Forms 5 and 6, the evaluation was performed from both the front surface and the rear surface of the recording medium, and a lower evaluation was adopted.

A: The character is clear and can be read without problems.

B: Expansion or a line width reduction is observed but the character can be read.

C: Blurring or interruption is observed but the character can be read.

D: The character is illegible.

Color Mixing Evaluation

30×30 rectangular recorded content for evaluation in which a solid pattern of the white ink and a solid pattern of the non-white ink were recorded while overlapping was recorded by the recording method described above. Separately, recorded content for comparison obtained by performing recording without using the non-white ink and containing the white ink composition and the treatment liquid was also recorded in each form. The L* of a white printed surface of each of the recorded content for evaluation and the recorded content for comparison was measured. With respect to the recorded content for evaluation, when the white ink composition was printed first, the measurement was performed from the rear side of the recording medium and when the non-white ink composition was printed first, the measurement was performed from the front side of the recording medium. With respect to the recorded content for comparison, the measurement was performed from the same direction as that of the recorded content for evaluation.

Based on the obtained L*, the color mixing evaluation was performed according to the following evaluation criteria. Forms 5 and 6 were excluded from the evaluation.

A: The L* of the recorded content for evaluation is 90% or more to the L* of the recorded content for comparison.

B: The L* of the recorded content for evaluation is 80% or more and less than 90% to the L* of the recorded content for comparison.

C: The L* of the recorded content for evaluation is 70% or more and less than 80% to the L* of the recorded content for comparison.

D: The L* of the recorded content for evaluation is less than 70% to the L* of the recorded content for comparison.

Abrasion Resistance

The recorded surface of the recorded content for evaluation of the color mixing evaluation was rubbed 10 times while applying a 400 g load with a friction element in which a plain cloth was attached to Gakushin-type rubbing fastness tester AB-301 (Trade Name, manufactured by TESTER SANGYO CO., LTD.). Then, the peeling of a recording pattern portion of the recording medium was visually observed, and then evaluated according to the following evaluation criteria.

A: No peeling occurs and no transfer to the cloth occurs.

B: No peeling occurs but transfer to the cloth occurs.

C: Peeling occurs and the area of a peeled portion is less than 10 percent to an evaluation area.

D: Peeling occurs and the area of a peeled portion is 10 percent or more to an evaluation area.

Discharge Stability of White Ink Composition

Recording of the recorded content for the evaluation for color mixing evaluation was continuously performed for 1 hour. After recording, non-discharge nozzle inspection was performed.

A: There is no non-discharge nozzle.

B: The non-discharge nozzles account for 1 to 2% of the number of nozzles used for recording.

C: The non-discharge nozzles account for 3 to 5% of the number of nozzles used for recording.

D: The non-discharge nozzles account for 6% or more of the nozzle groups used for recording.

Discharge Stability of Non-White Ink Composition

The number of nonfunctioning nozzles was counted and evaluated under the same conditions as the conditions of the discharge stability of the white ink composition. The discharge stability of Forms 5 and 6 was evaluated for the nozzle group on the most upstream. The evaluation criteria are the same as those of the white ink.

It was found that the sharpness of the obtained recorded content was excellent in all Examples using the treatment liquid and using the ink set satisfying a relationship that the viscosity increase by coagulation is lower in the white ink composition than in the non-white ink composition. On the other hand, in all Comparative Examples not using the treatment liquid and not using the ink set satisfying the relationship, the sharpness was poor. A detailed description is given.

The comparison of Examples 10, 11, 24, and 1 shows that the discharge stabilities of the white ink compositions and the non-white ink compositions are improved when the surface temperature of the recording medium is lower but, on the other hand, the character evaluation, the color mixing evaluation, and the abrasion resistance of the obtained recorded content are excellent when the surface temperature of the recording medium is higher.

From the comparison of Examples 12, 13, and 1, there is a tendency that recorded content excellent in the character evaluation and the color mixing evaluation is obtained when the adhesion amount of the treatment liquid is large based on the total amount of the ink composition and recorded content excellent in abrasion resistance is obtained when the adhesion amount of the treatment liquid is small based on the total amount of the ink composition.

The comparison of Examples 14 to 18 with Examples 1 and 6 to 9 shows that the character evaluation and the color mixing evaluation are excellent and the discharge stability is also improved due to the fact that the ratio of viscosity increase by drying of the white ink composition is higher than the ratio of viscosity increase by drying of the non-white ink composition.

From the comparison of Examples 3 to 5, 23, and 1, when a polyvalent metal salt and a cationic polymer were used as the coagulant, the abrasion resistance was enhanced. Moreover, when a polyvalent metal salt was used as the coagulant, the discharge stability was improved. It was found that, by increasing the adhesion temperature when a cationic polymer was used as the coagulant, the sharpness was able to be made better.

From the comparison of Examples 6 and 8 with Example 1, the sharpness was enhanced when the treatment liquid adhesion was performed between the adhesion of the white ink and the adhesion of the non-white ink or simultaneously with the adhesion of the white ink.

From the comparison of Example 7 with Example 1, the sharpness was improved when the adhesion of the non-white ink is performed after the adhesion of the treatment liquid and before the adhesion of the white ink.

From the comparison of Example 7 with Example 1, the discharge stability of the non-white ink was improved when the distance in the subscanning direction between the nozzle group of the treatment liquid used for recording and the nozzle group of the non-white ink used for recording is longer.

In Examples 8 and 7, the positional relationship of the treatment liquid nozzle group and the non-white ink nozzle group used for recording was the same but the discharge stability of the non-white ink was better in Example 8 than in Example 7. In Example 8, it is presumed that mist of the treatment liquid was hard to reach the non-white ink nozzle group due to the presence of the white ink nozzle group in a portion overlapping the treatment liquid nozzle group.

From Example 9, when the nozzle groups used for recording of the non-white ink became a portion overlapping the nozzle group used for recording of the treatment liquid in the main scanning direction, there was a tendency that the discharge stability of the non-white ink was poor but is slightly better than that of Example 20. This showed that, when the non-white ink was recorded using the nozzle group overlapping the treatment liquid nozzle group in the subscanning direction, the white ink nozzle group and the non-white ink nozzle group were disposed in this order as viewed in the main scanning direction from the treatment liquid nozzle group, whereby the discharge stability of the non-white ink is enhanced.

The comparison of Example 7 with Example 22 showed that, also when the non-white ink nozzle group used for recording is located at a position in the subscanning direction different from the position of the treatment liquid nozzle group used for recording, the white ink nozzle group and the non-white ink nozzle group were disposed in this order as viewed in the main scanning direction from the treatment liquid nozzle group used for recording, whereby the discharge stability of the non-white ink is enhanced.

On the other hand, when the ratio of viscosity increase by coagulation is higher in the white ink composition than in the non-white ink composition as in Comparative Examples 1 to 5, 7, and 8, recorded content excellent in sharpness was not obtained. Moreover, when the treatment liquid was not used as in Comparative Example 6, the result that bleeding occurred and the sharpness was poor was obtained.

Although not indicated in the tables, the ratio of viscosity increases by coagulant of the white ink and the non-white ink by the treatment liquid used for the recording in each recording example were measured, and then the ratio of viscosity increases by coagulant of the white ink and the non-white ink were compared. Then, the same comparisons as those indicated in the tables were obtained. This showed that excellent sharpness was obtained due to the fact that the ratio of viscosity increase by coagulant by the treatment liquid used for recording is smaller in the white ink than in the non-white ink.

The entire disclosure of Japanese Patent Application No. 2018-046638 filed Mar. 14, 2018 is expressly incorporated herein by reference.

What is claimed is:

1. An ink set comprising:
    a white ink composition containing a white coloring material and a resin, the resin being dispersed in the form of an emulsion or as fine particles, and the resin having an acid value of 15 mgKOH/g or less;
    a non-white ink composition containing a non-white coloring material, a dispersant having an acid value of 20 mgKOH/g or more, and a resin; and
    a treatment liquid containing a coagulant for coagulating a component of the non-white ink composition,
    wherein, when a 5% by mass calcium acetate monohydrate aqueous solution and each of the ink compositions are mixed, a ratio of a viscosity after the mixing to a viscosity before the mixing is lower in the white ink composition than in the non-white ink composition.

2. The ink set according to claim 1, wherein
    when 50% by mass of each of the ink compositions is evaporated, a ratio of a viscosity increase after the evaporation to a viscosity increase before the evaporation is higher in the white ink composition than in the non-white ink composition.

3. The ink set according to claim 1, wherein
    a content of a pigment of the white ink composition is larger than a content of a pigment of the non-white ink composition.

4. The ink set according to claim 1, wherein
    the coagulant is any one of:
        a polyvalent metal salt;
        an organic acid or a salt of the organic acid; or
        a cationic compound.

5. The ink set according to claim 1, wherein
    the white coloring material is at least any one of a metal oxide or a hollow resin particle.

6. The ink set according to claim 1, wherein
    the ratio of the viscosity increase after the mixing to the viscosity increase before the mixing is 3.00 or less in the white ink composition.

7. The ink set according to claim 1, wherein
    when 50% by mass of each of the ink compositions is evaporated, a ratio of a viscosity increase after the evaporation to a viscosity increase before the evaporation is 20.00 or more in the white ink composition.

8. The ink set according to claim 1, wherein the resin contained in the white ink composition is an acrylic resin.

9. The ink set according to claim 1, wherein the dispersant contained in the non-white ink composition has an acid value of 50 mgKOH/g or more.

* * * * *